United States Patent
Noh et al.

(10) Patent No.: US 11,601,173 B2
(45) Date of Patent: *Mar. 7, 2023

(54) REFERENCE SIGNAL MEASUREMENT METHOD AND APPARATUS FOR USE IN MOBILE COMMUNICATION SYSTEM

(71) Applicant: Samsung Electronics Co., Ltd., Suwon-si (KR)

(72) Inventors: Jihwan Noh, Suwon-si (KR); Taeyoung Kim, Seoul (KR); Hyunil Yoo, Suwon-si (KR); Keonkook Lee, Suwon-si (KR); Suryong Jeong, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 53 days.

This patent is subject to a terminal disclaimer.

(21) Appl. No.: 17/178,530

(22) Filed: Feb. 18, 2021

(65) Prior Publication Data

US 2021/0175946 A1    Jun. 10, 2021

Related U.S. Application Data

(63) Continuation of application No. 15/237,615, filed on Aug. 15, 2016, now Pat. No. 10,931,342.

(30) Foreign Application Priority Data

Aug. 13, 2015 (KR) .......... 10-2015-0114739
Oct. 26, 2015 (KR) .......... 10-2015-0148909

(51) Int. Cl.
*H04B 7/06* (2006.01)
*H04L 5/00* (2006.01)

(52) U.S. Cl.
CPC ......... *H04B 7/0617* (2013.01); *H04B 7/0626* (2013.01); *H04L 5/0048* (2013.01)

(58) Field of Classification Search
CPC ............ H04L 5/0048; H04L 5/0057; H04L 5/0035; H04B 7/0617; H04B 7/0413;
(Continued)

(56) References Cited

U.S. PATENT DOCUMENTS

2013/0142125 A1    6/2013 Shimezawa et al.
2013/0196675 A1    8/2013 Xiao et al.
(Continued)

FOREIGN PATENT DOCUMENTS

KR    10-2013-0069783 A    6/2013
KR    10-2015-0035555 A    4/2015
WO       2014/069956 A1    5/2014

OTHER PUBLICATIONS

Korean Intellectual Property Office, "Office Action", dated Jun. 30, 2021, in connection with Korean Patent Application No. 10-2015-0148909, 10 pages.
(Continued)

*Primary Examiner* — Khaled M Kassim
*Assistant Examiner* — Najeeb Ansari

(57) ABSTRACT

For converging a $5^{th}$-Generation (5G) communication system and supporting higher data rates beyond a $4^{th}$-Generation (4G) system with a technology for Internet of Things (IoT), a channel state information (CSI) acquisition method includes transmitting CSI configuration information to a terminal, selecting a beam for transmitting a beamformed CSI reference signal (BF-CSI-RS) to the terminal, transmitting the BF-CSI-RS to the terminal using the selected beam, and notifying the terminal of a beamforming update. A base station for acquiring CSI in a mobile communication system includes a transceiver configured to transmit and receive signals, and a controller configured to control the transceiver to transmit CSI configuration information to a terminal, to select a beam for transmitting a BF-CSI-RS to the terminal,
(Continued)

to transmit the BF-CSI-RS to the terminal using the selected beam, and to notify the terminal of a beamforming update.

16 Claims, 16 Drawing Sheets

(58) Field of Classification Search
CPC ............... H04B 7/0456; H04B 7/0417; H04B 7/0695; H04W 72/042; H04W 72/0413; H04W 24/10; H04W 28/18
See application file for complete search history.

(56) References Cited

U.S. PATENT DOCUMENTS

| | | |
|---|---|---|
| 2013/0328722 A1 | 12/2013 | Wernersson et al. |
| 2015/0043450 A1 | 2/2015 | Ariyavisitakul et al. |
| 2015/0162966 A1 | 6/2015 | Kim et al. |
| 2015/0230102 A1 | 8/2015 | Kang et al. |
| 2015/0365152 A1 | 12/2015 | Frenne et al. |
| 2016/0028519 A1 | 1/2016 | Wei |
| 2016/0105817 A1* | 4/2016 | Frenne ............... H04B 7/0626 370/252 |
| 2016/0143055 A1 | 5/2016 | Nammi et al. |
| 2016/0269159 A1 | 9/2016 | Soriaga et al. |
| 2016/0277954 A1 | 9/2016 | Frenne et al. |
| 2016/0278077 A1* | 9/2016 | Song ....................... H04W 8/22 |
| 2016/0294454 A1 | 10/2016 | Onggosanusi et al. |
| 2016/0301505 A1 | 10/2016 | Furuskog et al. |
| 2017/0332267 A1 | 11/2017 | Kim et al. |
| 2018/0076870 A1 | 3/2018 | Kim et al. |
| 2018/0091196 A1 | 3/2018 | Frenne et al. |
| 2018/0102817 A1 | 4/2018 | Park et al. |
| 2018/0115357 A1 | 4/2018 | Park et al. |
| 2018/0175983 A1 | 6/2018 | Yum et al. |
| 2018/0376359 A9 | 12/2018 | Kim et al. |

OTHER PUBLICATIONS

LTE; Evolved Universal Terrestrial Radio Access (E-UTRA) and Evolved Universal Terrestrial Radio Access Network (E-UTRAN); Overall description; Stage 2; ETSI TS 136 300 V11.8.0, Jan. 2014, 219 pages.
Korean Intellectual Property Office, "Notification of a Decision to Grant" dated Dec. 31, 2021, in connection with Korean Patent Application No. 10-2015-0148909, 7 pages.
3GPP TR 36.897 V13.0.0 (Jun. 2015); Technical Report; 3rd Generation Partnership Project; Technical Specification Group Radio Access Network; Study on elevation beamforming / Full-Dimension (FD) Multiple Input Multiple Output (MIMO) for LTE (Release 13); 58 pages.

* cited by examiner

FIG. 2

| CSI reference signal configuration | Number of CSI reference signals configured | | | | | |
|---|---|---|---|---|---|---|
| | 1 or 2 | | 4 | | 8 | |
| | (k', l') | $n_s \bmod 2$ | (k', l') | $n_s \bmod 2$ | (k', l') | $n_s \bmod 2$ |
| 0 | (9,5) | 0 | (9,5) | 0 | (9,5) | 0 |
| 1 | (11,2) | 1 | (11,2) | 1 | (11,2) | 1 |
| 2 | (9,2) | 1 | (9,2) | 1 | (9,2) | 1 |
| 3 | (7,2) | 1 | (7,2) | 1 | (7,2) | 1 |
| 4 | (9,5) | 1 | (9,5) | 1 | (9,5) | 1 |
| 5 | (8,5) | 0 | (8,5) | 0 | | |
| 6 | (10,2) | 1 | (10,2) | 1 | | |
| 7 | (8,2) | 1 | (8,2) | 1 | | |
| 8 | (6,2) | 1 | (6,2) | 1 | | |
| 9 | (8,5) | 1 | (8,5) | 1 | | |
| 10 | (3,5) | 0 | | | | |
| 11 | (2,5) | 0 | | | | |
| 12 | (5,2) | 1 | | | | |
| 13 | (4,2) | 1 | | | | |
| 14 | (3,2) | 1 | | | | |
| 15 | (2,2) | 1 | | | | |
| 16 | (1,2) | 1 | | | | |
| 17 | (0,2) | 1 | | | | |
| 18 | (3,5) | 1 | | | | |
| 19 | (2,5) | 1 | | | | |

(Frame structure type1 and 2)

REFERENCE SIGNAL MEASUREMENT METHOD AND APPARATUS FOR USE IN MOBILE COMMUNICATION SYSTEM

CROSS-REFERENCE TO RELATED APPLICATIONS

The present application is a continuation of U.S. patent application Ser. No. 15/237,615 filed on Aug. 15, 2016, which is related to and claims priority under 35 U.S.C. 119(a) to Korean Patent Application No. 10-2015-0114739 filed on Aug. 13, 2015, and Korean Patent Application No. 10-2015-0148909 filed on Oct. 26, 2015, the disclosures of which are herein incorporated by reference in their entirety.

TECHNICAL FIELD

The present invention relates to a reference signal (RS) measurement method and apparatus for use in a mobile communication system. In particular, the present invention relates to a method and apparatus for measuring Channel State Information Reference Signal (CSI-RS).

BACKGROUND

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

SUMMARY

To address the above-discussed deficiencies, it is a primary object to provide an enhanced reference signal measurement method and apparatus for use in a mobile communication system.

Also, the present invention aims to provide a method for notifying a terminal of beamforming updates in a communication system operating with a Beamformed CSI-RS (BF-CSI-RS).

In accordance with an aspect of the present invention, a channel state information (CSI) acquisition method of a base station is provided for use in a mobile communication system. The CSI acquisition method includes transmitting CSI configuration information to a terminal, selecting a beam for transmitting a beamformed CSI reference signal (BF-CSI-RS) to the terminal, transmitting the BF-CSI-RS to the terminal using the selected beam, and notifying the terminal of a beamforming update.

In accordance with another aspect of the present invention, a base station for acquiring channel state information (CSI) in a mobile communication system is provided. The base station includes a transceiver for transmitting and receiving signals and a controller which controls transmitting CSI configuration information to a terminal, selecting a beam for transmitting a beamformed CSI reference signal (BF-CSI-RS) to the terminal, transmitting the BF-CSI-RS to the terminal using the selected beam, and notifying the terminal of a beamforming update.

In accordance with another aspect of the present invention, a channel state information (CSI) report method of a terminal is provided for use in a mobile communication system. The CSI report method includes receiving CSI configuration information from a base station, measuring channel state based on a beamformed CSI reference signal (BF-CSI-RS) transmitted by the base station, and generating CSI based on the channel state measurement result and indication of a beamforming update.

In accordance with still another aspect of the present invention, a terminal for reporting channel state information (CSI) in a mobile communication system is provided. The terminal includes a transceiver for transmitting and receiving signals and a controller which controls receiving CSI configuration information from a base station, measuring channel state based on a beamformed CSI reference signal (BF-CSI-RS) transmitted by the base station, and generating CSI based on the channel state measurement result and indication of a beamforming update.

The objects of the present invention are not limited to the aforesaid, and other objects not described herein with be clearly understood by those skilled in the art from the descriptions below.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 2 is a diagram illustrating CSI-RS configurations according to an embodiment of the present invention;

DETAILED DESCRIPTION

FIGS. 1 through 16, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged telecommunication technologies.

Various embodiments of the present invention are described in detail with reference to the accompanying drawings. The same reference numbers are used throughout the drawings to refer to the same or like parts. Detailed descriptions of well-known functions and structures incorporated herein may be omitted to avoid obscuring the subject matter of the present invention. In the following, descriptions are made of only the parts necessary for understanding the operations in accordance with various embodiments of the present invention and are not made of the other parts to avoid obscuring the subject matter of the present invention.

The main entity responsible for allocating resources to a terminal may be one of a Node B, an evolved Node B (eNB), a Base Station (BS), a radio access unit, a base station controller, and any network node. The terminal may be one of a User Equipment (UE), a Mobile Station (MS), a cellular phone, a smartphone, a computer, and a communication-enabled multimedia system. In the present invention, the term "Downlink (DL)" denotes the radio link from the eNB to the UE, and the term "Uplink (UL)" denotes the radio link from the UE to the eNB. Although the following descriptions are directed to Long Term Evolution (LTE) and LTE-Advanced (LTE-A) systems, it will be understood by those skilled in the art that the present invention can be applied even to other communication systems having a similar technical background and channel format, with a slight modification, without departing from the spirit and scope of the present invention. For convenience of explanation, the description is directed to an LTE system.

In the following description, the terms "beamforming update" and "measurement restriction" may be used in similar meanings. Measurement reset may be an example of the measurement restriction. That is, if a UE receives a beamforming update, it can perform beamforming update or determine that beamforming is required. However, it is not always the case that the beamforming update indicates change of a beam. Beamforming update can occur periodically or aperiodically to configure a specific beam or the same beam as before per terminal at an update timing.

According to an embodiment of the present invention, if beamforming is applied, this means that a beamformed-CSI-RS (BF-CSI-RS) is transmitted.

Figure 1:
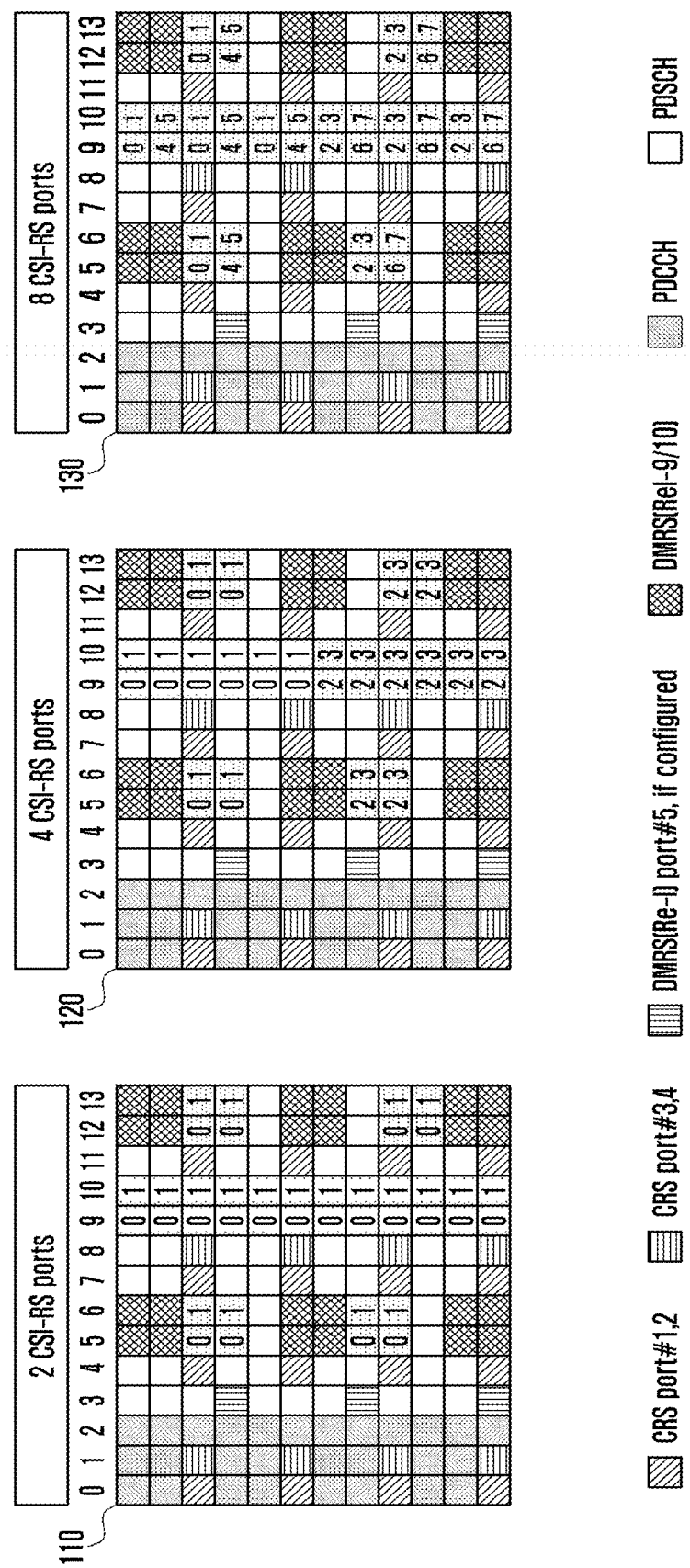
FIG. 1 is a diagram illustrating CSI-RS patterns dependent on the number of antenna ports according to an embodiment of the present invention.

FIG. 1 is a diagram illustrating CSI-RS patterns dependent on the number of antenna ports according to an embodiment of the present invention.

It is possible to transmit a Channel State Information-Reference Signal (CSI-RS) for 1, 2, 4, and 8 antenna ports in such a way of being mapped to p=15, p=15 and 16, p15~18, and p15=22, respectively. In FIG. 1, reference numbers 110, 120, and 130 denote resource blocks (RBs) with different CSI-RS patterns. An RB consists of two Physical Resource Blocks (PRBs). An RB consists of 12 subcarriers in the frequency domain and 14 symbols in the time domain. FIG. 1 shows the resource structures for the normal Cyclic Prefix (CP) length. The present invention can be applied to the case of using the resource structures for the extended CP length and, in this case, an RB consists of 12 symbols in the time domain. In FIG. 1, an RB consists of a plurality of Resource Elements (REs). In the RB 110, the REs marked as 0 and 1 are the REs to which CSI-RSs for two antenna ports mapped. In the RB 120, the REs marked as 0, 1, 2, and 3 are the REs to which CSI-RSs for four antenna ports are mapped. In the RB 130, the REs marked as 0, 1, 2, 3, 4, 5, 6, and 7 are the REs to which CSI-RSs for eight antenna ports are mapped. FIG. 2 is a diagram illustrating CSI-RS configurations according to an embodiment of the present invention.

In the LTE specification, the CSI-RS can be transmitted in a cell-specific manner in preconfigured subframes. The cell-specific transmission means that the UEs located within the same cell receive the same CSI-RS transmitted by an eNB. The UE can measure the CSI-RS without explicit indication from the eNB. The UE reports the CSI-RS measurement result to the eNB periodically or aperiodically. The CSI can include a Channel Quality Indicator (CQI), a Precoding Matrix Indicator (PMI), and a Rank Indicator (RI).

The eNB sets a Modulation and Coding Scheme (MCS) level to a value suitable for data to be transmitted to the UE based on the CSI received from the UE to meet a data reception performance. The CQI indicates Signal to Interface and Noise Ratio (SINR) and is expressed in the form of an MCS level capable of meeting the predetermined data reception performance. The PMI/RI indicates the precoding/rank information for use by the eNB in transmitting data through multiple antennas in a Multiple Input Multiple Output (MIMO) system. A signal indicating downlink channel coefficient provides relatively detailed channel status information in comparison with the CSI, but it increases uplink overhead. Here, the UE receives CSI configuration information including a reporting mode indicating feedback information, resource information indicating resources to be used for transmission, and transmission periodicity from the eNB through higher layer signaling. The UE transmits CSI to the eNB based on the predetermined CSI configuration information.

Figure 3:
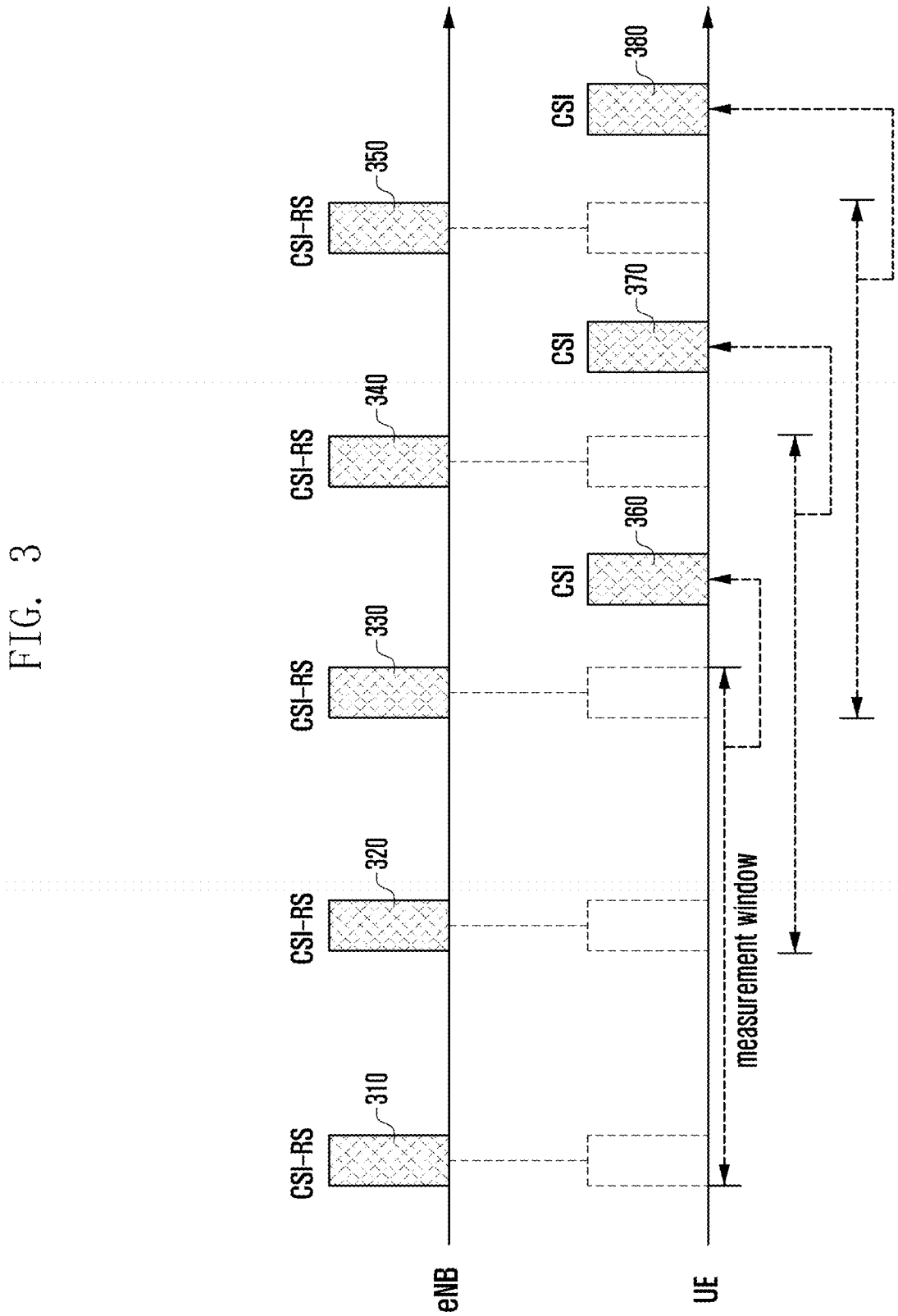
FIG. 3 is a diagram illustrating how the UE receives CSI-RSs transmitted by the eNB and reports CSI obtained based on the CSI-RSs according to an embodiment of the present invention.

The UE reports CSI with the average of a predetermined number of the latest received CSI-RSs to improve the accuracy of the CSI-RS measurement value. FIG. 3 is a diagram illustrating how the UE receives CSI-RSs transmitted by the eNB and reports CSI obtained based on the CSI-RSs according to an embodiment of the present invention.

With reference to FIG. 3, three CSI-RS measurement values are used per CSI report, and the measurement unit for three CSI-RSs is referred to as a measurement window. The measurement window can be configured differently according to the implementation characteristics per UE. The measurement window can be defined as a CSI-RS measurement unit (unit of subframes) for a CSI report. Although FIG. 3 is directed to the case where the measurement window is configured to have 3 CSI-RS subframes, the measurement window can be configured to have 1 CSI-RS or n CSI-RSs. The measurement window can be configured by the UE internally or according to the CSI-RS configuration from the eNB.

In FIG. 3, reference numbers 310 to 350 denote CSI-RSs transmitted from the eNB to the UE, and reference numbers 360 to 380 denote CSI reports transmitted from the UE to the eNB. In FIG. 3, the measurement includes three CSI-RSs. The UE reports the CSI 360 obtained based on the measurements of the CSI-RSs 310, 320, and 330 of three subframes. The UE reports the CSI 370 obtained based on the measurements of the CSI-RSs 320, 330, and 340 of three subframes. The UE reports the CSI 380 obtained based on the measurements of the CSI-RSs 330, 340, and 350 of three subframes. The UE can measure multiple CSI-RSs within the measurement window and report the measurement result in the above-described method.

In a Full Dimension MIMO (FD-MIMO) system, an eNB can use UE-specific beamforming to transmit CSI-RS to a certain UE. Such a CSI-RS transmission technique is referred to as beamformed CSI-RS (BF-CSI-RS) or beamforming CSI-RS. In the case of BF-CSI-RS transmission, the eNB forms a beam suitable for a specific UE to improve the CSI-RS measurement performance. Like the legacy CSI-RS transmission scheme, the BF-CSI-RS is transmitted in preconfigured subframes periodically or aperiodically. Unlike the legacy cell-specific CSI-RS transmission scheme, the eNB can change the direction of the CSI-RS beam in the BF-CSI-RS transmission scheme. Such a beamforming update is performed in such a way that the eNB calculates the beam direction suitable for the UE based on the Sounding Reference Signal (SRS) transmitted by the UE. However, if the UE does not know the presence of a beamforming update, this can cause a problem in the CSI-RS measurement-based CSI report. That is, if the UE is not aware of the change of the CSI-RS beam, this can cause a significant problem.

Figure 4:
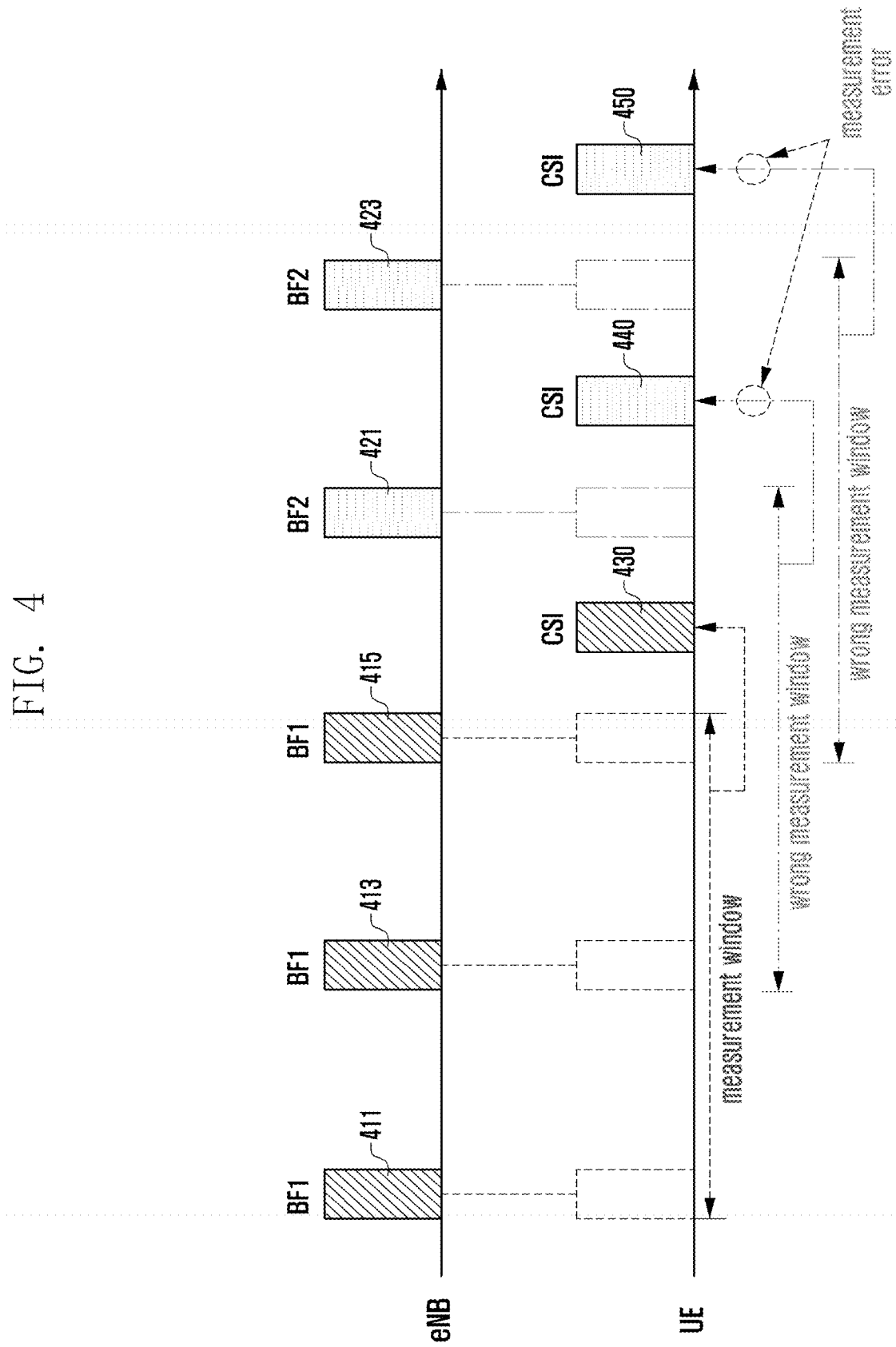
FIG. 4 is a diagram illustrating a beamforming update situation incurring problems in a CSI-RS report that can be solved by the present invention.

FIG. 4 is a diagram illustrating a beamforming update situation incurring problems in CSI-RS report that can be solved by the present invention.

In FIG. 4, the measurement window of the UE corresponds to a duration including 3 CSI-RS subframes, and it is assumed that a beamforming update occurs in the fourth CSI-RS subframe of the eNB. That is, the CSI-RS is transmitted in the first beamforming configuration as denoted by reference numbers 411, 413, and 415, and the eNB transmits the CSI-RS in the second beamforming configuration as denoted by reference numbers 421 and 423 after the transmission of the CSI-RS 415. In the embodiment of FIG. 4, it is assumed that the first and second beamforming directions are different from each other.

In this situation, if the CSI-RS measurement and CSI report are performed during the legacy measurement window, the beamforming update can cause CSI report error. If the UE reports the measurement results made on the different beams together, this can be regarded as a CSI report error. The first CSI 430 corresponds to the measurement results of the CSI-RSs 411, 413, and 415 that are beamformed in the same direction. However, each of the second and third CSIs 440 and 450 corresponds to the measurement result of BF-CSI-RSs that are beamformed in different directions (BF1 and BF2), resulting in errors. That is, the second CSI 440 corresponds to the CSI-RSs 413 and 415 beamformed in the first beamforming configuration and the CSI-RS 421 beamformed in the second beamforming configuration; thus, the measurement report containing the measurement results on the differently beamformed RSs causes an error. Likewise, the third CSI 450 corresponds to the CSI-RS 415 beamformed in the first beamforming configuration and the CSI-RSs 421 and 423 beamformed in the second beamforming configuration; thus, the measurement report containing the measurement results on the differently beamformed RSs causes an error.

In order to avoid a measurement report error caused by beamforming update during the measurement window, it is necessary for the eNB to notify the UE of a beamforming update. However, there is no operation and method proposed yet for notifying the UE of a beamforming update concerning the CSI-RS beamforming technique. There is therefore a need of a method for solving the CSI report error caused by the measurement window and beamforming update.

The present invention proposes a measurement restriction scheme for correcting CSI-RS report errors in the BF-CSI-RS transmission system. The measurement restriction schemes according to various embodiments are described hereinafter. According to an embodiment of the present invention, a method for notifying a UE of a beamforming update is proposed for use in the communication system supporting the BF-CSI-RS.

Figure 5:
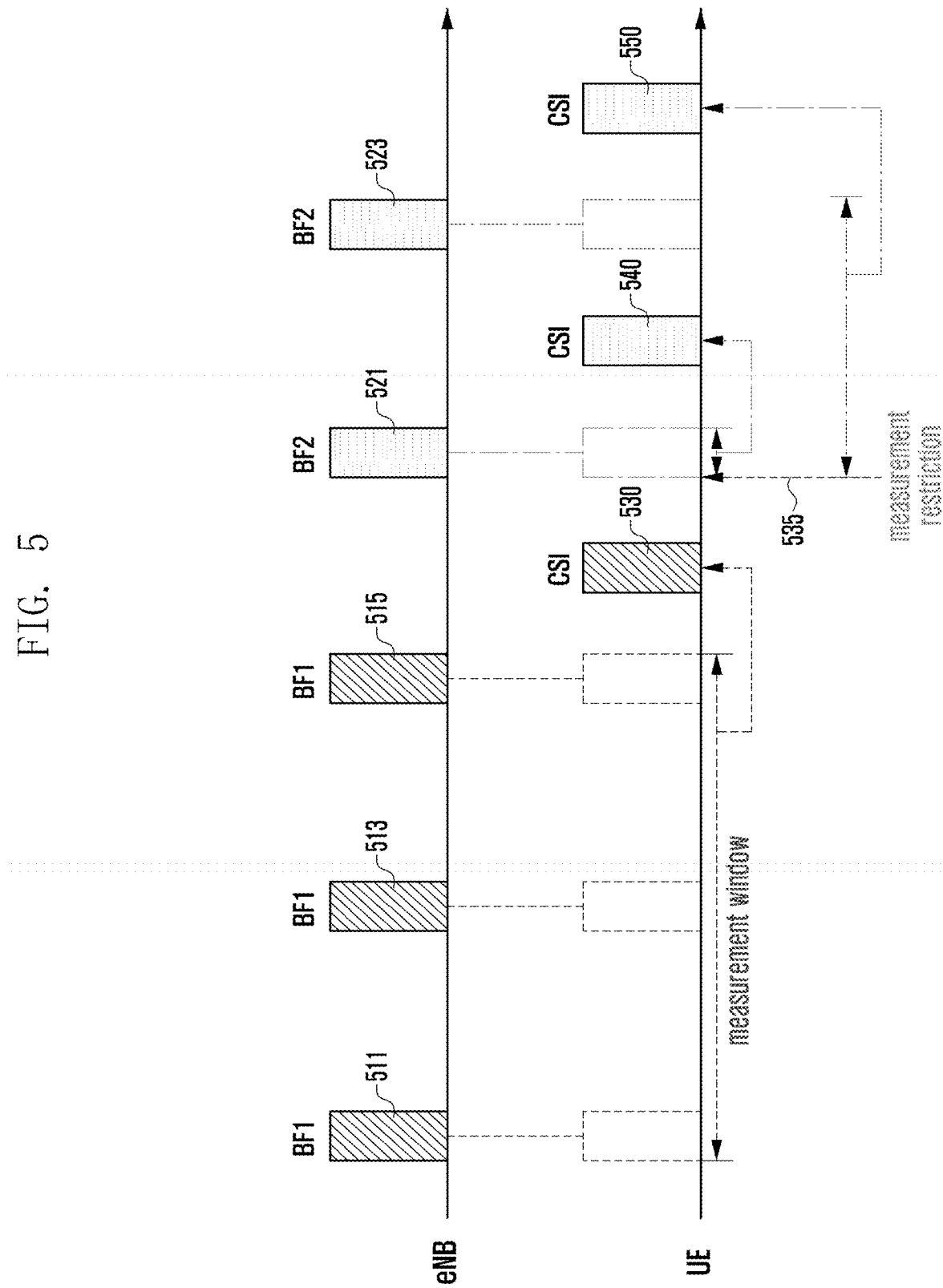
FIG. 5 is a diagram illustrating a measurement restriction in a beamforming update situation according to an embodiment of the present invention.

FIG. 5 is a diagram illustrating a measurement restriction in a beamforming update situation according to an embodiment of the present invention.

The eNB configures beamforming suitable for the UE. For example, the eNB can configure beamforming suitable for the UE based on the SRS or CSI transmitted by the UE. If a BF-CSI-RS generated based on the beamforming configuration is received, the UE measures the BF-CSI-RS. The UE configures a measurement window and performs a CSI report obtained by averaging the CSI-RSs received within the measurement window to improve the CSI-RS measurement accuracy.

Similar to the embodiment of FIG. 4, if the UE configures the measurement window without awareness of the beamforming update occurring at the eNB, the measurement window is likely to be inaccurate, resulting in CSI report error. In order to solve this problem, it is necessary for the UE to perform CSI-RS measurement restriction upon detection of the beamforming update. One of the representative measurement restriction methods proposed in the embodiments of the present invention is measurement reset. The measurement reset can be performed in such a way of instructing the UE to initialize measurement. If the beamforming update indicates "measurement reset", the CSI-RS configuration information received before the beamforming update is not applied for the CSI report. At this time, the measurement information obtained based on the CSI-RS received before the beamforming update is not considered regardless of the preconfigured measurement window size. That is, although the measurement window is configured with three CSI-RSs, if a beamforming update occurs, the UE generates the CSI-RS reports with one or two CSI-RSs received after the beamforming update with the exception of the CSI-RS received before the beamforming update.

Referring to FIG. 5, the measurement window of the UE corresponds to a duration including 3 CSI-RS subframes, and it is assumed that a beamforming update occurs in the fourth CSI-RS subframe of the eNB. That is, the CSI-RSs 511, 513, and 515 are transmitted in the first beamforming configuration (BF1) and, after the beamforming update, the CSI-RSs 521 and 523 are transmitted in the second beamforming configuration (BF2).

It is assumed that the UE receives a beamforming update indication or measurement reset indication at a time point 530. The measurement window decreases by 1 subframe per occurrence of measurement reset at the UE and increases by 1 upon receipt of BF-CSI-RS up to a predetermined number of subframes that corresponds to the window size. That is, the CSI 540 can be generated based on one CSI-RS (i.e., CSI-RS 521), and the CSI 550 can be generated based on two CSI-RSs (i.e., CSI-RSs 521 and 523). If the beamforming update or measurement reset is indicated, the UE can report CSI without decreasing the measurement window size, i.e., maintaining but ignoring the measurement window. That is, although the measurement window including 3 CSI-RS subframes is maintained in the first CSI report even after the measurement reset, the UE can report the measurement result acquired based on the CSI-RSs received after the measurement reset regardless of the measurement window.

Accordingly, the UE has to know the information on the measurement restriction for accurate measurement window configuration. Embodiments of the present invention propose various methods for transmitting a measurement restriction indicator to a UE.

It is necessary for the UE to measure incoming interference to calculate SINR. For this purpose, the eNB configures CSI-RS-Interference Measurement (CSI-IM) resource per UE. FIGS. 4 and 5 exemplify the measurement restriction based on the CSI-RS allocated to the UE. However, measurement restriction is required for the CSI-IM for the same reason as the CSI-RS. In the present invention, it is assumed that the measurement restriction is separately applied to the CSI-RS and CSI-IM. Although descriptions are made in association with CSI-RS in various embodiments of the present invention, the same methods are applicable to CSI-IM.

Figure 6:
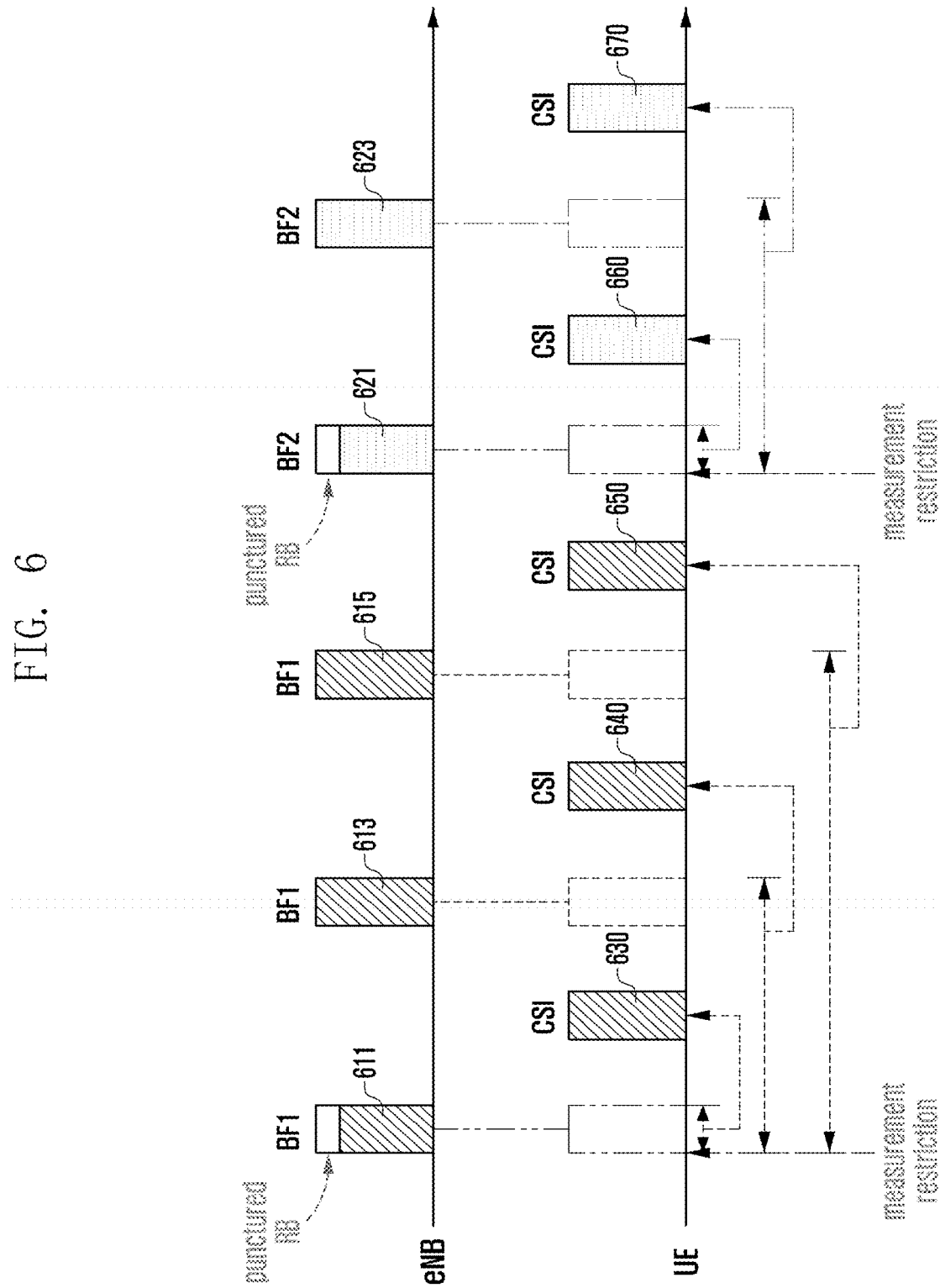
FIG. 6 is a diagram illustrating a resource puncturing-based measurement restriction method according to an embodiment of the present invention.

FIG. 6 is a diagram illustrating a resource puncturing-based measurement restriction method according to an embodiment of the present invention.

In an embodiment of the present invention, it can be possible to perform measurement restriction by puncturing RB(s) or indicate a beamforming update. In the case of puncturing the CSI-RSs mapped to certain resource positions of an RB, the UE can interpret this as an indication of measurement restriction or beamforming update.

In FIG. 6, the measurement window of the UE corresponds to a duration including 3 CSI-RS subframes, and it is assumed that a beamforming update occurs at the first and fourth CSI-RS subframes 611 and 621 of the eNB. That is, the CSI-RSs 611, 613, and 615 are transmitted in the first beamforming configuration (BF1) and, after the beamforming update, the CSI-RSs 621 and 623 are transmitted in the second beamforming configuration (BF2).

In the embodiment of FIG. 6, the eNB can puncture the first RBs of the subframes 611 and 621 in which a beamforming update occurs (RB puncturing). The eNB can transmit the CSI-RS subframe in which CSI-RSs have been punctured. The UE senses the first RB of the received subframe to check the presence/absence of a CSI-RS and determine whether a beamforming update has occurred based thereon. For example, the UE can check that a certain RB of the subframe 611 can have no CSI-RS. The UE can interpret this as the occurrence of a beamforming update. The UE can report the CSI 630 obtained based on the CSI-RS received in the subframe 611 without consideration of the CSI-RSs received in the previous subframes. The UE can report the CSI 640 obtained based on the CSI-RSs in the subframes 611 and 613 and the CSI 650 obtained based on the CSI-RSs in the subframes 611, 613, and 615. The UE can adjust the size of the measurement window after a beamforming update or report the CSI generated based on the CSI-RSs received after the beamforming update regardless of the measurement window.

If the subframe 621 is received, the UE can check that a specific RB of the subframe 621 has no CSI-RS. The UE can interpret this as occurrence of a beamforming update. In the embodiment of FIG. 6, the beamforming configuration is changed from the first beamforming configuration (BF1) to the second beamforming configuration (BF2). The UE can report the CSI 660 obtained based on the CSI-RSs received in the subframe 621 without consideration of the CSI-RSs received in the previous subframes. The UE can report the CSI 670 obtained based on the CSI-RSs received in the subframes 621 and 623. In this way, the UE can adjust the size of the measurement window after a beamforming update or report the CSI obtained based on the CSI-RSs received after the beamforming update regardless of the measurement window.

The embodiment of FIG. 6 negates extra overhead for indicating beamforming update or measurement restriction. The eNB notifies the UE of the change of the beamforming configuration by puncturing the CSI-RS RB such that the UE performs measurement restriction at an accurate timing. In the embodiment of FIG. 6, the eNB has to puncture a specific RB for a measurement restriction indication. In the case that the bandwidth is 20 megahertz (MHz), it is expected that puncturing one RB or a small number of RBs does not impact the CSI-RS measurement performance of the corresponding UE because there are 100 RBs.

The embodiment of FIG. 6 exemplifies a case where the first RB for the corresponding UE is punctured to indicate measurement restriction. However, the embodiment of FIG. 6 includes all of the cases of puncturing part of RBs allocated to the UE to indicate measurement restriction in addition to the above embodiment. That is, two or more RBs can be punctured for measurement restriction indication, and n RBs can be punctured in the CSI-RS subframes. It can also be possible to preconfigure the positions of the punctured RBs between the eNB and UE. For example, a CSI configuration can be used. It can also be possible to use a predetermined message for measurement restriction indication. The message can be any of L1, L2, and L3 messages. The RB puncturing can be performed at any position of the RBs allocated to the UE.

The method according to the embodiment of FIG. 6 can be used for CSI-IM measurement. The eNB can puncture the first RBs of the CSI-RS subframes 611 and 615 in which measurement restriction occurs. The eNB can transmit the CSI-RS subframes after puncturing CSI-IM information mapped to the CSI-RS resources therein. The UE can sense the first RB of the received subframe to check the presence/absence of CSI-IM and determine whether a beamforming update has occurred. The UE can report CSI-IM measurement resource 630 obtained based on the CSI-IM information received in the subframe 611 without consideration of the CSI-IM information received in the previous subframes. The UE can report the CSI-IM measurement result 640 obtained based on the CSI-IM information received in the subframes 611 and 613 and the CSI-IM measurement result 650 obtained based on the CSI-IM information received in the subframes 611, 613, and 615. The UE can adjust the size of the measurement window after a beamforming update or generate the CSI report based on only the CSI-IM information received after a beamforming update regardless of the measurement window.

Figure 7:
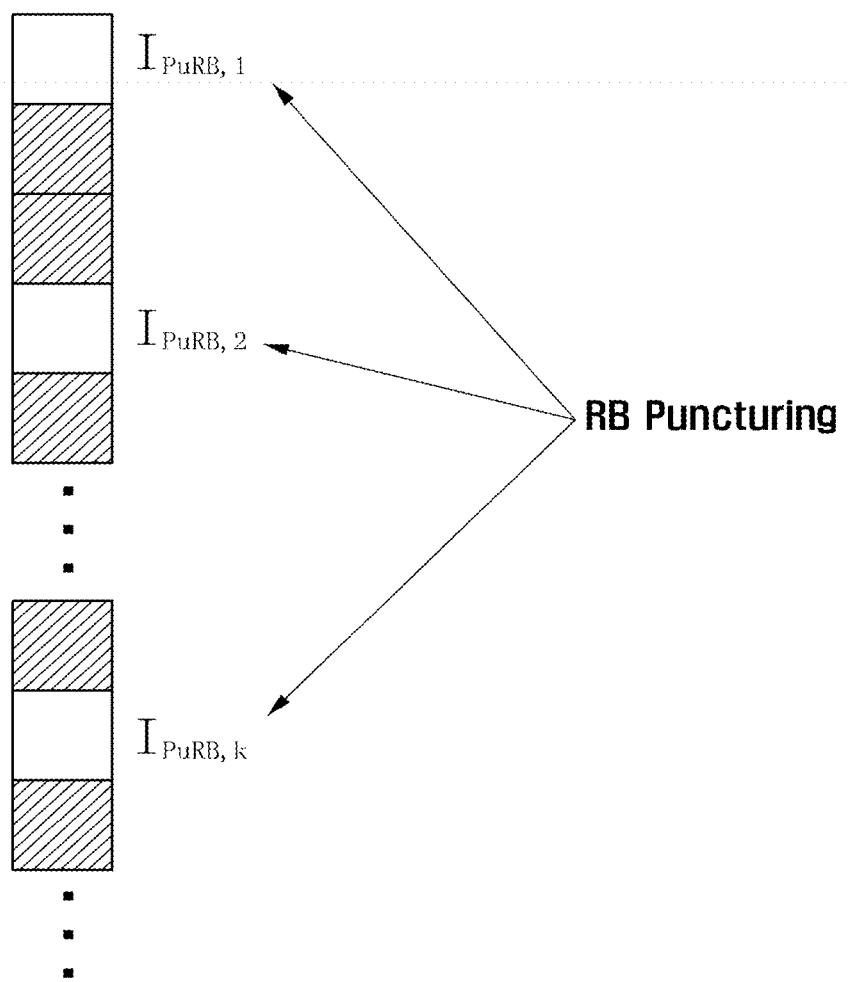
FIG. 7 is a diagram illustrating an RB puncturing pattern according to an embodiment of the present invention.

FIG. 7 is a diagram illustrating an RB puncturing pattern according to an embodiment of the present invention.

With reference to FIG. 7, the RB function pattern available in the frequency allocated to the UE can be defined by equation (1):

$$I_{P_uRB,k}=S_{P_uRB}+(k-1)T_{P_uRB}, k=1,\ldots,N_{P_uRB} \quad (1)$$

$I_{P_uRB,k}$: $k^{th}$ punctured RB index
$S_{P_uRB}$: first punctured RB index
$T_{P_uRB}$: punctured RB period
$N_{P_uRB}$: total number of punctured RBs in one subframe These parameters are preconfigured between the eNB and UE for generating an RB puncturing pattern to indicate measurement restriction.

Figure 8:
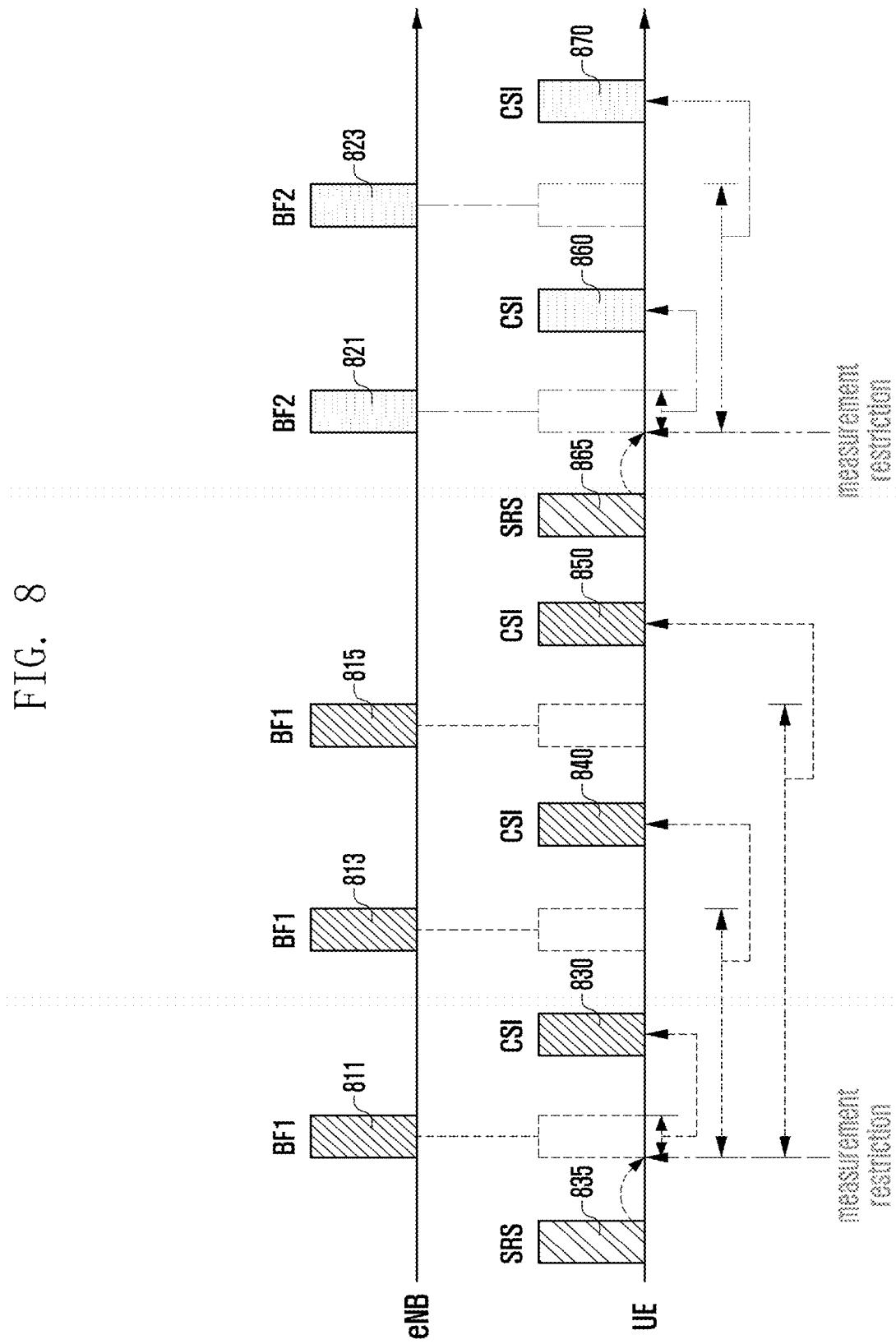
FIG. 8 is a diagram illustrating an SRS-based measurement restriction method according to an embodiment of the present invention.
Figure 9:
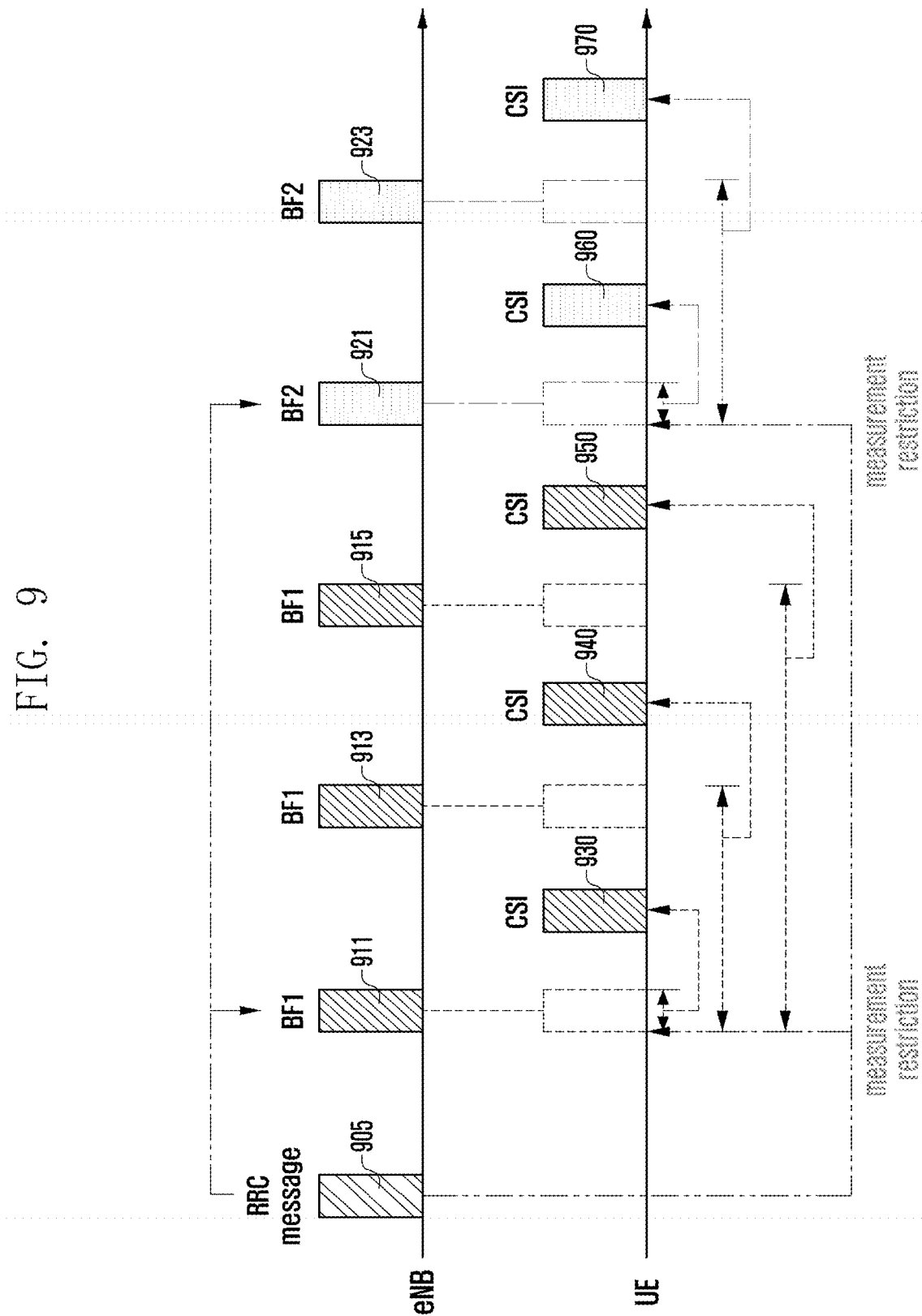
FIG. 9 is diagram illustrating a control signal-based measurement restriction method according to an embodiment of the present invention.
Figure 10:
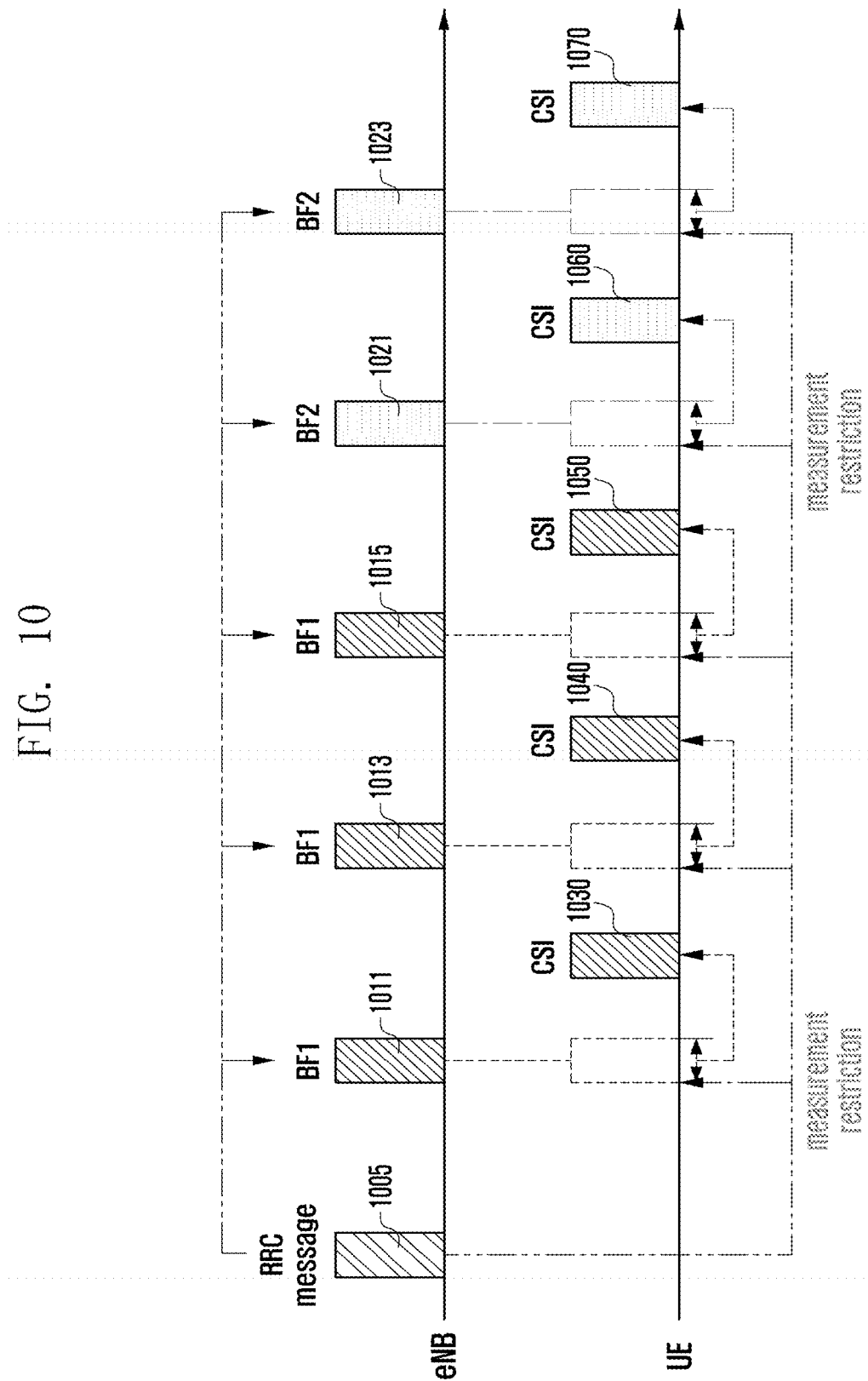
FIG. 10 is a diagram illustrating a control signal-based measurement restriction method when the measurement restriction period is one frame according to an embodiment of the present invention.

FIG. 8 is a diagram illustrating an SRS-based measurement restriction method according to an embodiment of the present invention.

FIG. 8 is directed to an SRS-based measurement restriction method of a UE. In the embodiment of FIG. 8, it is assumed that the eNB performs a beamforming update based on the SRS information. It can be possible to predict that the beamforming configuration changes in the BF-CSI-RS subframe after the UE transmits an SRS.

In the embodiment of FIG. 8, the UE performs measurement reset upon receipt of the first BF-CSI-RS after the UE transmits the SRS. In this case, the measurement restriction can be performed without extra overhead for a beamforming update or measurement restriction indication.

With reference to FIG. 8, the measurement window of the UE corresponds to a duration including 3 CSI-RS subframes, and it is assumed that a beamforming update occurs in the fourth CSI-RS subframe of the eNB. That is, the CSI-RSs 811, 813, and 815 are transmitted in the first beamforming configuration (BF1); and, after the eNB performs a beamforming update, the subframes 821 and 823 are transmitted in the second beamforming configuration (BF2).

The UE transmits the SRS 835. Upon receipt of the SRS 835, the eNB can perform a beamforming update. As a result of the beamforming update, the beamforming configuration for the UE can be changed or maintained. The UE can receive a CSI-RS in the subframe 811. The UE can regard the CSI-RS received after transmitting the SRS 835 as the CSI-RS transmitted after the occurrence of a beamforming update.

Afterward, the UE can report the CSI 830 obtained based on the CSI-RS received in the subframe 811 without consideration of the CSI-RS received in the previous subframe. The UE can report the CSI 840 obtained based on the CSI-RSs received in the subframes 811 and 813 and the CSI 850 obtained based on the CSI-RSs received in the subframes 811, 813, and 815. The UE can adjust the size of the measurement window after the beamforming update or report the CSI obtained based on the CSI-RSs received after the beamforming update regardless of the measurement window.

The UE transmits the SRS 865. Upon receipt of the SRS 865, the eNB can perform a beamforming update. As a result of the beamforming update, the beamforming configuration for the UE can be changed or maintained. The UE can receive a CSI-RS in the subframe 821. The UE can regard the CSI-RS received after transmitting the SRS 865 as the CSI-RS transmitted after the occurrence of a beamforming update.

As a consequence, the UE can check the occurrence of the beamforming occurrence. In the embodiment of FIG. 8, the UE can check the change from the first beamforming configuration (FB1) to the second beamforming configuration (FB2). The UE can report the CSI 860 obtained based on the CSI-RSs received in the subframe 821 without consideration of the CSI-RS received in the previous subframe. The UE can report the CSI 870 obtained based on the CSI-RSs in the subframes 811 and 813. In this way, the UE can adjust the size of the measurement window after the beamforming update or report the CSI obtained based on the CSI-RSs received after the beamforming update regardless of the measurement window.

In the embodiment of FIG. 8, although the eNB receives the SRS, this does not mean that the beamforming configuration for the UE is changed. Accordingly, there is a shortcoming of requiring measurement restriction according to the SRS transmission even when no beamforming update occurs. If the measurement restriction is performed without a beamforming configuration change, the BF-CSI-RS measurement accuracy can drop in the corresponding duration.

In order to apply the SRS-based measurement restriction method proposed in the embodiment of FIG. 8, it can be necessary to add the following expression to the CQI definition of 3GPP TS36.213 sub-clause 7.2.3:

7.2.3 Channel quality indicator (CQI) definition

The CQI indices and their interpretations are given in Table 7.2.3-1. Based on an unrestricted observation interval in time and frequency, the UE shall derive for each CQI value reported in uplink subframe n the highest CQI index between 1 and 15 in Table 7.2.3-1 which satisfies the following condition, or CQI index 0 if CQI index 1 does not satisfy the condition:

A single PDSCH transport block with a combination of modulation scheme and transport block size corresponding to the CQI index, and occupying a group of downlink physical resource blocks termed the CSI reference resource, could be received with a transport block error probability not exceeding 0.1.

The UE restricts the observation interval according to higher layer signaling.

The control message-based measurement restriction method can be categorized into three methods. The first method is to transmit the information indicating whether to on/off the measurement restriction using an RRC signal. In this case, the measurement restriction indicator is set to "on" and the UE uses a fixed-size measurement window. The second method is to transmit the information on the size of the measurement window using an RRC signal. This method can be interpreted as an extended version of the first method. In this method, the RRC signal can carry a value selected from [Off, 1, . . . , N]. The third method is to transmit the measurement reset timing periodicity and subframe offset information using an RRC signal as exemplified above. In the second method, the RRC signal can be configured in a similar way to the CSI-RS subframe configuration-related RRC signal defined in the current specification because the RRC signal includes the periodicity and offset information. The RRC signal for use in the third method can be configured as shown in Table 3. Table 3 can further include the subframe configurations with relatively short and/or long periodicities depending on necessity.

TABLE 3

| MR-subframeConfig $I_{MR}$ | MR periodicity (subframes) | MR subframe offset |
|---|---|---|
| 0-4 | 5 | $I_{MR}$ |
| 5-14 | 10 | $I_{MR}$-5 |
| 15-34 | 20 | $I_{MR}$-15 |
| 35-74 | 40 | $I_{MR}$-35 |
| 75-154 | 80 | $I_{MR}$-75 |

The measurement restriction-related information can be contained in one of three fields of the RRC signal. The first is the non-zero power CSI-RS resource configuration field, which is expressed as CSI-RS-ConfigNZP in RRC. The CSI-RS-ConfigNZP of the RRC signal is configured as follows. In the newly added part, ABC denotes a keyword that is added according to which one is used among the aforementioned control message-based measurement restriction methods.

```
CSI-RS-ConfigNZP-r11 ::=          SEQUENCE {
    csi-RS-ConfigNZPId-r11            CSI-RS-ConfigNZPId-r11,
    antennaPortsCount-r11             ENUMERATED (an1, an2, an4, an8),
    resourceConfig-r11                INTEGER (0..31),
    subframeConfig-r11                INTEGER (0..154),
    scramblingIdentity-r11            INTEGER (0..503),
    qcl-CRS-Info-r11                  SEQUENCE {
        qcl-ScramblingIdentity-r11        INTEGER (0..503),
        crs-PortsCount-r11                ENUMERATED (n1, n2, n4, spare1),
        mbsfn-SubframeConfigList-r11      CHOICE {
            release                           NULL,
            setup                             SEQUENCE {
                subframeConfigList                MBSFN-SubframeConfigList
            }
        }                                                     OPTIONAL,    -- Need ON
    }                                                         OPTIONAL,    -- Need OR
    ...
}
CSI-R3-ABC-r1x ::=     SEQUENCE {
    (Alt3-1) measurementRestriction-r1x   N,                  OPTIONAL,    -- Need ON
    (Alt3-2) measurementRestriction-r1x   INTEGER (1..N),     OPTIONAL,    -- Need ON
    (Alt3-3) measurementRestriction-r1x   INTEGER (0..154??), OPTIONAL,    -- Need ON
}
```

The second is the CSI process configuration field, which is expressed as CSI-Process in RRC. The CSI-Process of the RRC signal is configured as follows.

```
CSI-Process-r11 ::=            SEQUENCE {
    csi-ProcessId-r11              CSI-ProcessId-r11,
    csi-RS-ConfigNSPId-r1x         CSI-RS-ConfigNSPId-r1x
    csi-IM-ConfidId-r11            CSI-IM-ConfigId-r11,
    p-C-AndCBSRList-r11            SEQUENCE (SIZE (1..2)) OF P-C-AndCBSR-r11,
    cqi-ReportBothProc-r11         CQI-ReportsBothProc-r11       OPTIONAL,   -- Need OR
    cqi-ReportPeriodicProcId-r11   INTEGER                       OPTIONAL,   -- Need OR
                                   (0..maxCQI-ProcExt-r11)
    cqi-ReportAperiodicProc-r11    CQI-ReportAperiodicProc-r11   OPTIONAL,   -- Need OR
    ...
}
CSI-Process-ABC-r1x ::=        SEQUENCE {
    (Alt3-1) measurementRestriction-r1x    N,                OPTIONAL,   -- Need OR
    (Alt3-2) measurementRestriction-r1x    INTEGER (1..N),   OPTIONAL,   -- Need OR
    (Alt3-3) measurementRestriction-r1x    INTEGER           OPTIONAL,   -- Need OR
                                           (0..154??),
    (Alt3-1) measurementRestrictionIM-r1x  N,                OPTIONAL,   -- Need OR
    (Alt3-2) measurementRestrictionIM-r1x  INTEGER (1..N),   OPTIONAL,   -- Need OR
    (Alt3-3) measurementRestrictionIM-r1x  INTEGER           OPTIONAL,   -- Need OR
                                           (0..154??),
}
```

The third is the CSI reporting configuration field, which is expressed as CQI-ReportBothProc in RRC. The CQI-ReportBothProc of the RRC signal is configured as follows.

```
CQI-ReportBothProc-r11 ::=         SEQUENCE {
    ri-REF-CSI-ProcessId-r11          CSI-ProcessId-r11      OPTIONAL,   --Need OR
    pmi-PI-Report-r11                 ENUMERATED (setup)     OPTIONAL,   --Need OR
}
CQI-ReportBothProc-ABC-r1x ::=     SWQUENCE {
    (Aly3-1) measurementRestriction-r1x    N,                  OPTIONAL,      --Need OR
    (Aly3-1) measurementRestriction-r1x    INTEGER (1..N),     OPTIONAL,      --Need OR
    (Aly3-1) measurementRestriction-r1x    INTEGER (0..154??), OPTIONAL,      --Need OR
    (Aly3-1) measurementRestrictionIM-r1x  N,                  OPTIONAL,      --Need OR
    (Aly3-1) measurementRestrictionIM-r1x  INTEGER (1..N),     OPTIONAL,      --Need OR
    (Aly3-1) measurementRestrictionIM-r1x  INTEGER (0..154??), OPTIONAL,      --Need OR
}
```

Although the measurement restriction information in included in the CQI-ReportBothProc field in the third method, it can also be possible to include the measurement restriction information in one of the CQI-ReportModeAperiodic field (Aperiodic CSI reporting configuration) and CQI-ReportPeriodic field (Periodic CSI reporting configuration) for restricting periodic/aperiodic CSI-RS reporting selectively.

Figure 11:
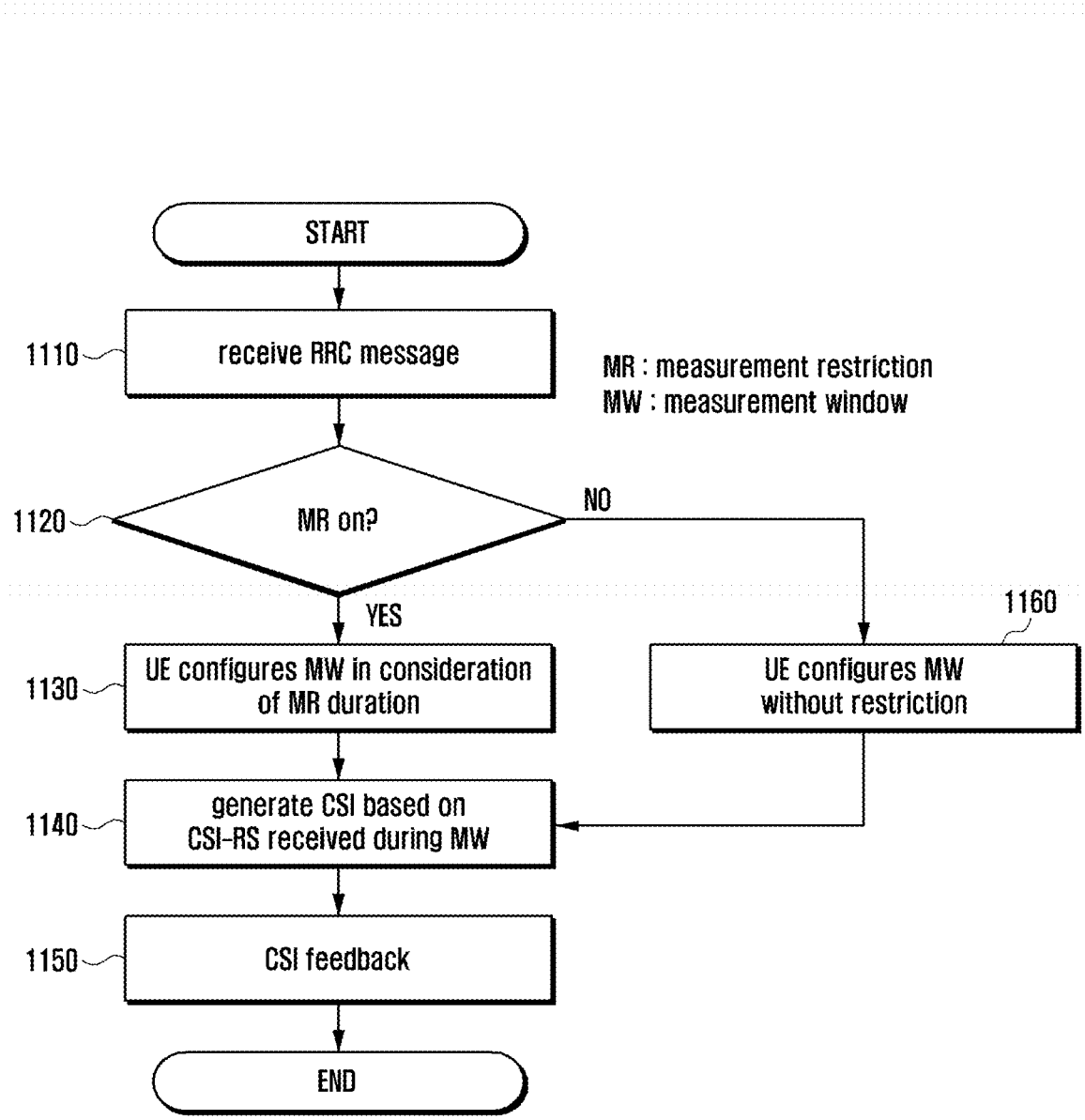
FIG. 11 is a flowchart illustrating a Downlink Control Information (DCI) format-based measurement restriction method according to an embodiment of the present invention.

FIG. 11 is a flowchart illustrating a Downlink Control Information (DCI) format-based measurement restriction method according to an embodiment of the present invention.

With reference to FIG. 11, the UE receives an RRC message at step 1110. The UE determines whether the measurement restriction is on at step 1120. The UE determines whether the measurement restriction is on based on the RRC message received at step 1110. The procedure goes to step 1130 or 1160 depending on the determination result at step 1120. If it is determined that the measurement restriction is on, the procedure goes to step 1130; if it is determined that the measurement restriction is off, the procedure goes to step 1160.

At step 1160, the UE configures the measurement window in the same way as the legacy procedure without any restriction. At step 1140, the UE generates CSI based on the CSI-RS received during the measurement window configured at step 1130. The UE transmits CSI feedback to the eNB at step 1150.

If it is determined that the measurement restriction is on, the procedure goes to step 1130. At step 1130, the UE configures the measurement window in consideration of the measurement restriction configuration.

At step 1140, the UE calculate the CSI based on the CSI-RSs received during the measurement window. At step 1150, the UE transmits the CSI to the eNB.

Figure 12:
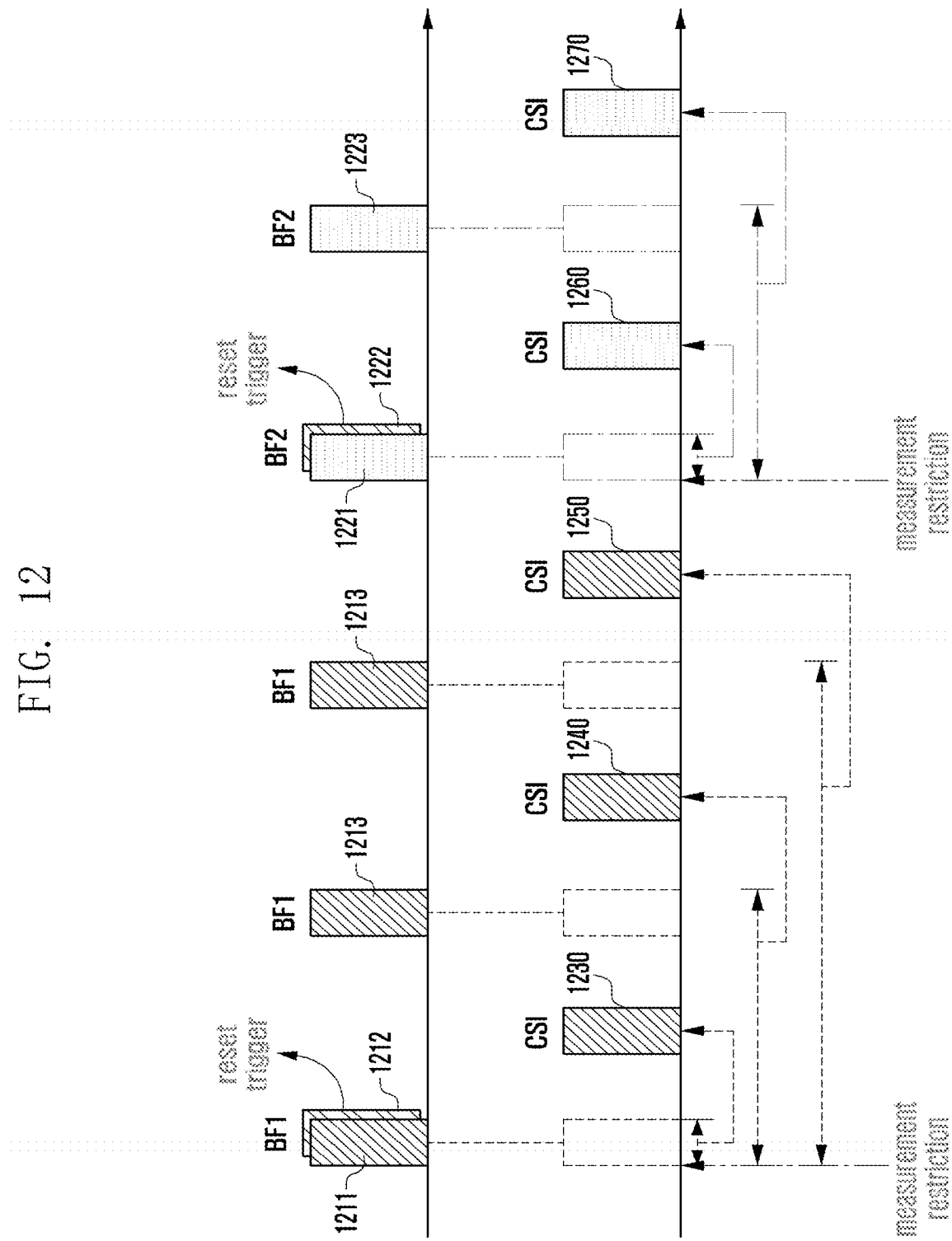
FIG. 12 is a diagram for explaining a DCI format-based measurement restriction method according to an embodiment of the present invention.

FIG. 12 is a diagram for explaining a DCI format-based measurement restriction method according to an embodiment of the present invention.

In the LTE system, the eNB transmits downlink or uplink data scheduling information to the UE using the Downlink Control Information (DCI). The DCI is classified into a plurality of formats to indicate whether the DCI includes uplink data scheduling information (UL grant) or downlink data scheduling information (DL grant), whether the control information size is compact, whether spatial multiplexing is applied, and whether the DCI is a power control DCI. In an embodiment of the present invention, it can be possible to indicate a beamforming update or measurement restriction using the DCI format.

FIG. 12 shows a DCI format-based measurement restriction or a beamforming update indication method according to an embodiment of the present invention.

As shown in FIG. 12, if a beamforming update occurs, the eNB transmits a restriction trigger to the UE using a DCI formation in the corresponding subframe. For this purpose, 1 bit is added to the DCI formation because it is sufficient for the reset trigger to indicate whether a beamforming update has occurred.

With reference to FIG. 12, the measurement window of the UE corresponds to a duration including 3 CSI-RS subframes, and it is assumed that a beamforming update occurs at the fourth CSI-RS subframe 1222 of the eNB. That is, the CSI-RSs 1211, 1213, and 1215 are transmitted in the first beamforming configuration (BF1); and, after the beamforming update, the CSI-RSs 1221 and 1223 are transmitted in the second beamforming configuration (BF2).

The eNB can indicate the subframes designated for a beamforming update or measurement restriction using a DCI format. The UE can decode the DCI received in the corresponding subframe to acquire the indication information.

The UE can report the CSI 1230 obtained based on the CSI-RSs received in the subframe 1211 without consideration of the CSI-RSs received before the subframe 1211. The UE can report the CSI 1240 obtained based on the CSI-RSs received in the subframes 1211 and 1213 and the CSI 1250 obtained based on the CSI-RSs received in the subframes 1211, 1213, and 1215.

The eNB can perform a beamforming update in the subframe 1221. As a result of the beamforming update, the beamforming configuration for the UE can be changed or maintained. The UE can receive the CSI-RS in the subframe 1221. The UE can check DCI to determine whether the subframe 1221 is designated for a beamforming update or measurement restriction.

The UE can report the CSI 1260 obtained based on the CSI-RS received in the subframe 1221 without consideration of the CSI-RSs received in the previous subframes. The UE can report the CSI 1270 obtained based on the CSI-RSs received in the subframes 1221 and 1223.

The method according to the embodiment of FIG. 12 gives a degree of freedom for change of beamforming configuration to the eNB because the beamforming update can occur in any subframe. However, this method incurs the extra overhead of a restriction trigger transmitted whenever a beamforming update occurs.

The measurement restriction indication method of this embodiment, like the methods according to other embodiments, can also be applied for CSI-IM measurement.

Figure 13:
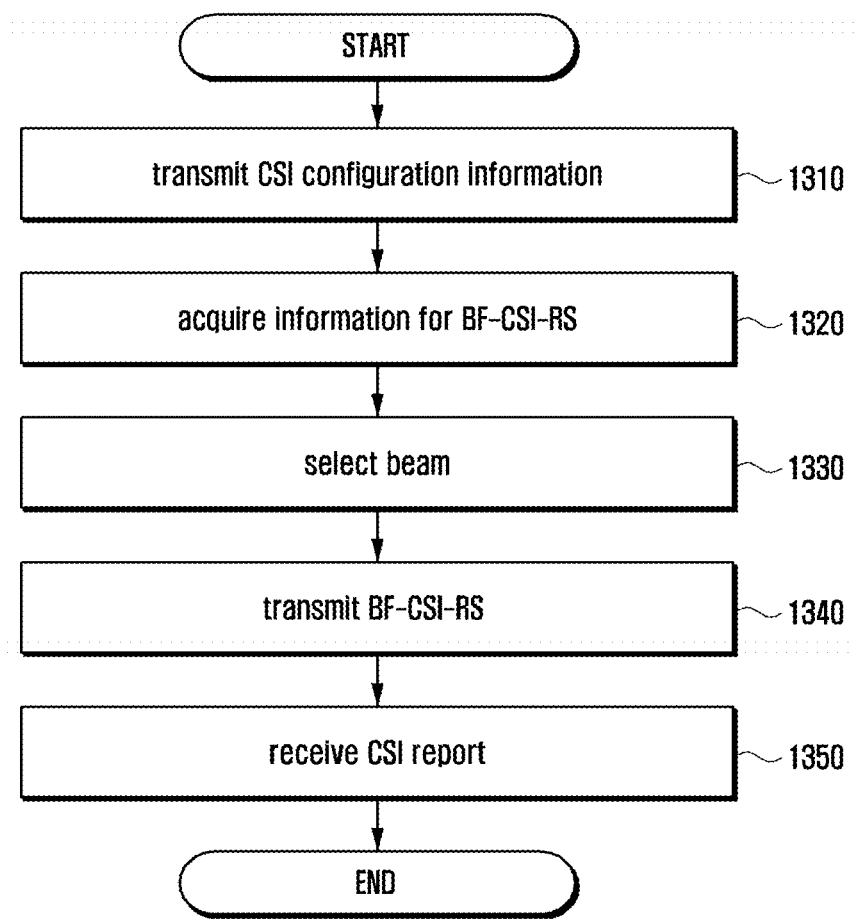
FIG. 13 is a flowchart illustrating an eNB operation of a method according to an embodiment of the present invention.

FIG. 13 is a flowchart illustrating an eNB operation of a method according to an embodiment of the present invention.

With reference to FIG. 13, the eNB can configure CSI-RS and transmit CSI-RS configuration information to the UE at step 1310. The CSI-RS configuration information can be non-precoding CSI-RS and/or BF-CSI-RS configuration information.

According to an embodiment, the configuration information can include a beamforming update or measurement restriction configuration information. The beamforming update or measurement restriction configuration information can be the information indicating, when a predetermined event is detected, occurrence of a beamforming update or measurement restriction. For example, it can be configured that the beamforming update or measurement restriction is indicated when an SRS transmission, resource puncturing, higher layer signaling, or a DCI format-based event occurs as described in various embodiments of the present invention.

The eNB can transmit the configuration information including the reporting mode indicating information contained in the CSI, resource to be used, and transmission periodicity. The eNB can transmit the CSI configuration information through higher layer signaling. The eNB can transmit CSI-RS configuration information using other types of messages (e.g., L1 and L2 messages).

The eNB can acquire the information for BF-CSI-RS at step 1320. The eNB can acquire the BF-CSI-RS information from the UE. The BF-CSI-RS information can include SRS and/or CSI obtained based on the non-precoding CSI-RS, the SRS and/or CSI being transmitted from the UE to the eNB. The BF-CSI-RS-related information can include other types of information that can be used for channel status measurement between the UE and the eNB.

The eNB can select a beam for the UE at step 1330. The beam can be used for transmitting a BF-CSI-RS. The eNB can select a beam for BF-CSI-RS based on the BF-CSI-RS information. If there is no selected BF-CSI-RS, the eNB can select a BF-CSI-RS; if there is a BF-CSI-RS selected already, the UE can perform a beamforming update with the selected beam. As a result of the beamforming update, the beam in use can be changed or maintained. The selected beam can be identical with the newly selected beam.

The beam selection can be performed based on the methods described in the embodiments of the present invention. In the case of the SRS-based method, the eNB can select a beam after the receipt of the SRS. In the case of the periodicity-based method, the eNB can select the beam according to a preconfigured periodicity. In the case of the aperiodicity-based method, the eNB can select the beam when an aperiodic CSI-RS configuration event is triggered.

The eNB can transmit a CSI-RS to the UE at step 1340. The CSI-RS can include a BF-CSI-RS. The BF-CSI-RS can be transmitted with the beam selected at the previous step. According to an embodiment of the present invention, it can be possible to indicate a beamforming update by DCI. It can also be possible to indicate a beamforming update by puncturing predetermined resources. The predetermined resources can be part of the resources to which the BF-CSI-RS is mapped.

As described above, the eNB may notify the UE whether a beamforming update has occurred and/or measurement restriction is required using the CSI-RS transmitted after the SRS transmission of the UE, CSI-RS transmitted in the subframe indicated in a control message, CSI-RS transmitted in a subframe in which part of the CSI-RS resources are punctured, and CSI-RS transmitted in the subframe carrying the DCI indicating a beamforming update. The measurement restriction can include adjusting measurement window size at the UE and reporting CSI without consideration of the measurement result obtained based on the CSI-RSs received before the beamforming update regardless of the configuration of the measurement window.

The eNB can receive the CSI transmitted by the UE at step 1350. The CSI can be the CSI obtained based on the BF-CSI-RS transmitted by the eNB. The eNB can schedule the UE based on the CSI report received from the UE.

As described above, the methods according to various embodiments of the present invention can be applicable to CSI-IM measurement as well as to CSI-RS measurement.

Figure 14:
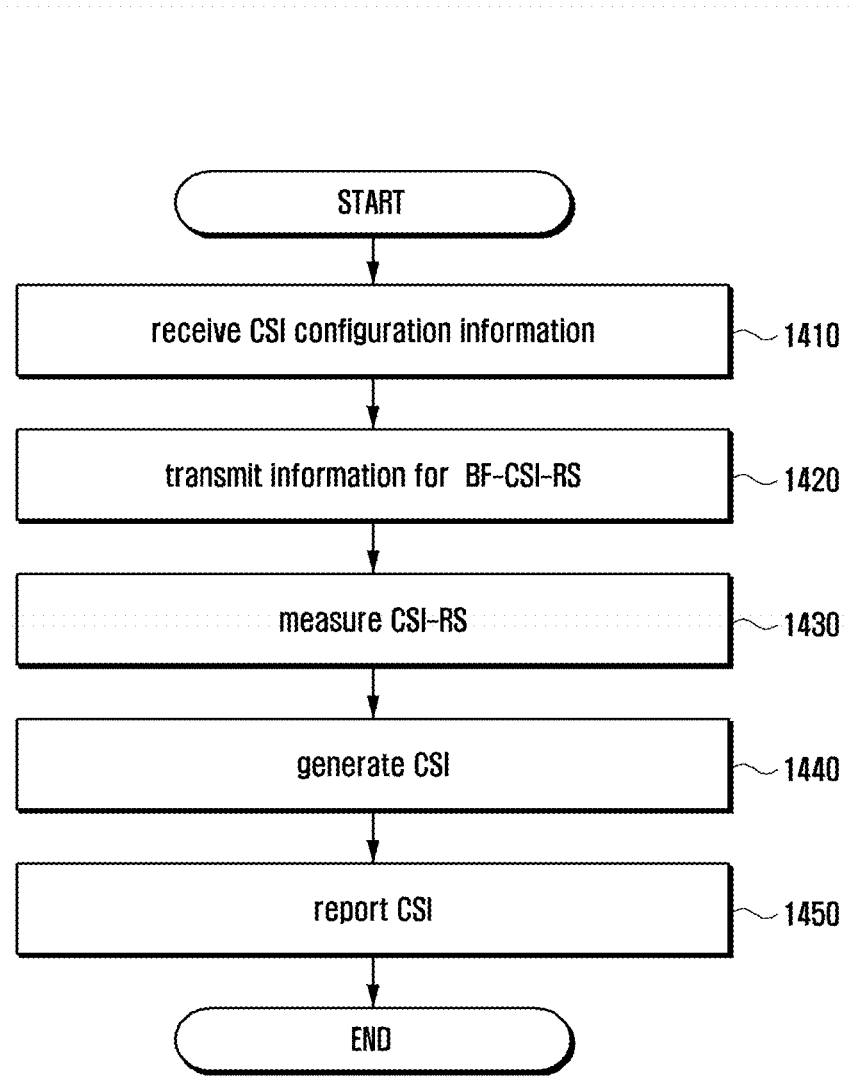
FIG. 14 is a flowchart illustrating a UE operation of a method according to an embodiment of the present invention.

FIG. 14 is a flowchart illustrating a UE operation of a method according to an embodiment of the present invention.

The UE can receive CSI configuration information from the eNB at step 1410. The CSI-RS configuration information can be non-precoding CSI-RS and/or BF-CSI-RS configuration information.

According to an embodiment, the configuration information can include a beamforming update or measurement restriction configuration information. The beamforming update or measurement restriction configuration information can be the information indicating, when a predetermined event is detected, occurrence of a beamforming update or measurement restriction. For example, it can be configured that the beamforming update or measurement restriction is indicated when an SRS transmission, resource puncturing, higher layer signaling, or a DCI format-based event occurs as described in various embodiments of the present invention.

The CSI configuration information can include the reporting mode indicating information contained in the CSI, resource to be used, and transmission periodicity; the UE can configure the CSI configuration information. The UE can receive the CSI configuration information through higher layer signaling. The UE can receive the CSI-RS configuration information through other types of messages (e.g., L1 and L2 messages).

The UE can transmit information for BF-CSI-RS at step 1420. The UE can transmit the information for BF-CSI-RS to the eNB. The information for BF-CSI-RS can include the SRS and/or CSI obtained based on the non-precoding CSI-RS, the SRS and/or CSI being transmitted from the UE to the eNB. The BF-CSI-RS-related information can include other types of information that can be used for channel status measurement between the UE and the eNB.

The UE can measure the channel state between the UE and eNB based on the CSI-RS at step 1430. The CSI-RS can include non-precoding CSI-RS and BF-CSI-RS. The BF-CSI-RS can be transmitted with the beam determined based on the information for BF-CSI-RS, the information being transmitted from the UE to the eNB at step 1420.

The UE can generate CSI at step 1440. The UE can select CSI-RS for use in generating the CSI-RS according to whether the beamforming update or measurement restriction is indicated. For example, if the beamforming update or measurement restriction is indicated, the UE can adjust the measurement window size or generate the CSI-RS without consideration of the channel state obtained based on the CSI-RSs before the indication of a beamforming update or measurement restriction.

As described above, the eNB may notify the UE whether a beamforming update has occurred and/or measurement restriction is required using the CSI-RS transmitted after the SRS transmission of the UE, CSI-RS transmitted in the subframe indicated in a control message, CSI-RS transmitted in a subframe in which part of the CSI-RS resources are punctured, and CSI-RS transmitted in the subframe carrying the DCI indicating a beamforming update. The measurement restriction can include adjusting measurement window size at the UE and reporting CSI without consideration of the measurement result obtained based on the CSI-RSs received before the beamforming update regardless of the configuration of the measurement window.

The UE can transmit the CSI to the eNB at step 1450. The CSI transmitted to the eNB can be used for scheduling the UE.

Figure 15:
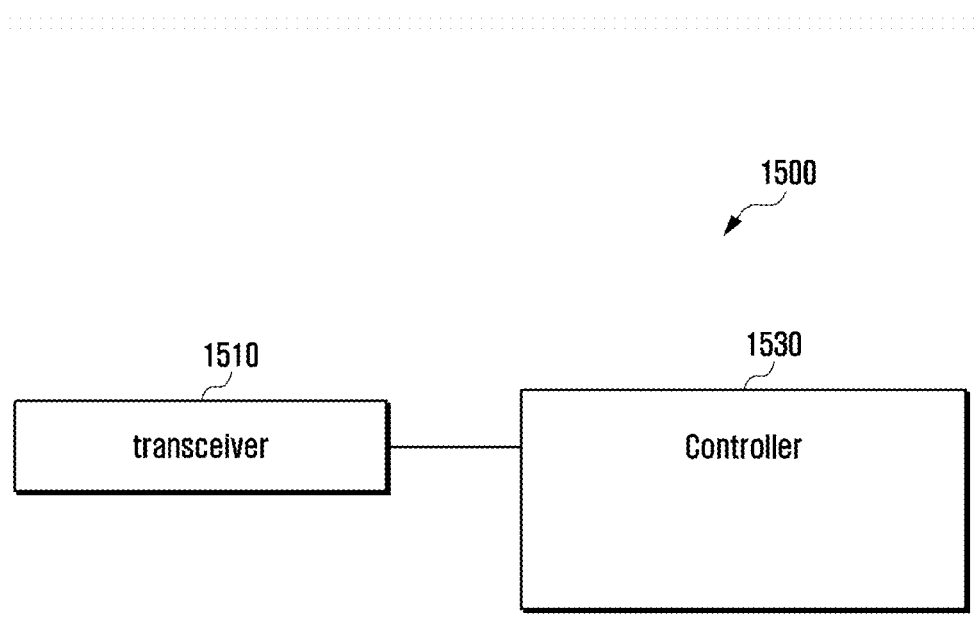
FIG. 15 is a block diagram illustrating a configuration of an eNB according to an embodiment of the present invention.

FIG. 15 is a block diagram illustrating a configuration of an eNB according to an embodiment of the present invention.

With reference to FIG. 15, the eNB 1500 can include a transceiver 1510 and a controller 1530. The eNB 1500 is capable of communicating with other devices by means of the transceiver 1510. The transceiver 1510 can transmit and receive signals. The transceiver 1510 can include a transmitter and a receiver. The controller 1530 can control the overall operations of the eNB 1500.

According to an embodiment of the present invention, the controller 1530 can control the eNB to transmit CSI configuration information to a UE, select a beam for transmitting BF-CSI-RS to the UE, transmit the BF-CSI-RS based on the selected beam, and notify the UE of a beamforming update.

The controller 1530 can also control to indicate the beamforming update using the control information including a beamforming update periodicity. The controller 1530 can also control to indicate the beamforming update using DCI in the subframe carrying the BF-CSI-RS.

The controller 1530 can also control to receive an SRS from the UE and instruct the UE to assume that the beamforming update is applied to the BF-CSI-RS received after the SRS transmission.

The controller 1530 can also control to indicate the beamforming update by puncturing part of the resources to which the BF-CSI-RS is mapped in the subframe carrying the BF-CSI-RS.

The channel measurement result obtained based on the CSI-RSs received before the beamforming update can be excluded from the CSI generated by the UE.

The operations and functions of the eNB 1500 and controller 1530 are not limited to the description made with reference to FIG. 15. The eNB 1500 and the controller 1530 can perform the operations and functions described with reference to FIGS. 1 to 14.

Figure 16:
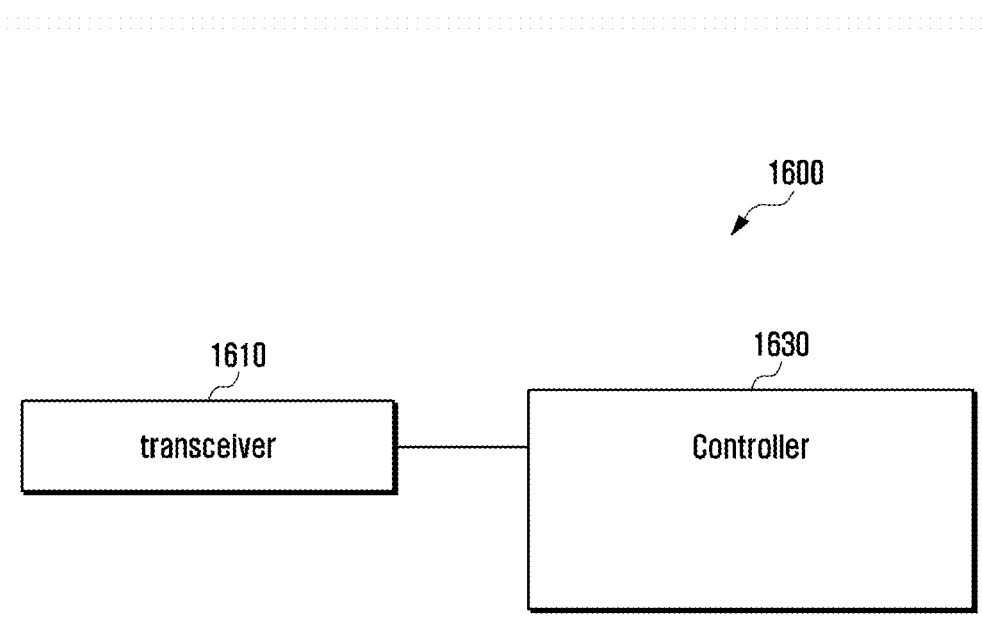
FIG. 16 is a block diagram illustrating a configuration of a UE according to an embodiment of the present invention.

FIG. 16 is a block diagram illustrating a configuration of a UE according to an embodiment of the present invention.

With reference to FIG. 16, the UE 1600 can include a transceiver 1610 and a controller 1630. The UE 1600 is capable of communicating with other devices by means of the transceiver 1610. The transceiver 1610 can transmit and receive signals. The transceiver 1610 can include a transmitter and a receiver. The controller 1630 can control the overall operations of the UE 1600.

According to an embodiment of the present invention, the controller 1630 can control the UE to receive CSI-RS configuration information from an eNB, measure channel state based on the BF-CSI-RS received from the eNB, and generate CSI based on the channel state measurement result and a beamforming update indication.

The controller 1630 can check the beamforming update indication based on the control information transmitted by the eNB, the control information including beamforming update periodicity.

The controller 1630 can also check the beamforming update indication based on the DCI in the subframe carrying the BF-CSI-RS.

The controller 1630 can also control the UE to transmit an SRS to the eNB and assume that a beamforming update is applied to the BF-CSI-RS received after the transmission of the SRS.

The controller 1630 can also check the beamforming update indication based on the resource punctured in the resources to which the BF-CSI-RS is mapped in the subframe carrying the BF-CSI-RS.

The controller 1630 can also control to exclude the channel measurement result obtained based on the CSI-RSs received before the beamforming update indication from generating CSI.

The operations and functions of the UE 1600 and controller 1630 are not limited to the description made with reference to FIG. 16. The UE 1600 can perform the operations and functions described with reference to FIGS. 1 to 13.

The embodiments of the present invention have been described with reference to separate drawings for convenience of explanation. However, the embodiments of the present invention may be executed in a combined manner as well as separately.

As described above, the reference signal measurement method and apparatus of the present invention is advantageous in terms of improving reference signal measurement efficiency.

Also, the reference signal measurement method and apparatus of the present invention is advantageous in terms of reflecting a beamforming update to a terminal in a communication system operating with a BF-CSI-RS.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method performed by a terminal in a wireless communication system, the method comprising:
receiving, from a base station, a radio resource control (RRC) message including a channel state information-reference signal (CSI-RS) configuration for beamformed CSI-RS, and a first indicator indicating whether a channel measurement restriction is supported;
measuring at least one non-zero power CSI-RS for a downlink channel state based on the CSI-RS configuration for the beamformed CSI-RS;
obtaining first channel state information (CSI) for the downlink channel state measured in one subframe before reporting the first CSI based on a measurement restriction window, in case that the first indicator indicates that the channel measurement restriction is supported, wherein the first indicator is used to restrict the at least one non-zero power CSI-RS used to obtain the first CSI based on the CSI-RS configuration; and
reporting the first CSI for the downlink channel state to the base station.

2. The method of claim 1, wherein the first CSI is obtained based on a non-zero power CSI-RS measured in the one subframe before reporting the first CSI without averaging other non-zero power CSI-RSs.

3. The method of claim 1, wherein the first CSI is obtained in case that the beamformed CSI-RS is configured and the first indicator indicating that the channel measurement restriction is supported, and
wherein a configured size of the measurement restriction window is used for obtaining the first CSI in case that the channel measurement restriction is supported.

4. The method of claim 1, wherein the RRC message includes a channel state information-interference measurement (CSI-IM) configuration,
wherein second CSI for the downlink channel state is obtained based on the CSI-IM configuration and the CSI-RS configuration for beamformed CSI-RS, in case that the RRC message includes a second indicator indicating that interference measurement restriction is supported, and
wherein the second indicator is used to restrict at least one zero power CSI-RS used to obtain the second CSI based on the CSI-IM configuration.

5. A terminal in a wireless communication system, the terminal comprising:
a transceiver; and
a controller configured to:
receive, from a base station via the transceiver, a radio resource control (RRC) message including a channel state information-reference signal (CSI-RS) configuration for beamformed CSI-RS, and a first indicator indicating whether a channel measurement restriction is supported,
measure at least one non-zero power CSI-RS for a downlink channel state based on the CSI-RS configuration for the beamformed CSI-RS,
obtain first channel state information (CSI) for the downlink channel state measured in one subframe before reporting the first CSI based on a measurement restriction window, in case that the first indicator indicates that the channel measurement restriction is supported, wherein the first indicator is used to restrict the at least one non-zero power CSI-RS used to obtain the first CSI based on the CSI-RS configuration, and
report, to the base station via the transceiver, the first CSI for the downlink channel state.

6. The terminal of claim 5, wherein the first CSI is obtained based on a non-zero power CSI-RS measured in the one subframe before reporting the first CSI without averaging other non-zero power CSI-RSs.

7. The terminal of claim 5, wherein the first CSI is obtained in case that the beamformed CSI-RS is configured and the first indicator indicating that the channel measurement restriction is supported, and
wherein a configured size of the measurement restriction window is used for obtaining the first CSI in case that the channel measurement restriction is supported.

8. The terminal of claim 5, wherein the RRC message includes a channel state information-interference measurement (CSI-IM) configuration,
wherein second CSI for the downlink channel state is obtained based on the CSI-IM configuration and the CSI-RS configuration for beamformed CSI-RS, in case that the RRC message includes a second indicator indicating that interference measurement restriction is supported, and
wherein the second indicator is used to restrict at least one zero power CSI-RS used to obtain the second CSI based on the CSI-IM configuration.

9. A method performed by a base station in a wireless communication system, the method comprising:
transmitting a radio resource control (RRC) message including a channel state information-reference signal (CSI-RS) configuration for beamformed CSI-RS, and a first indicator indicating whether a channel measurement restriction is supported to a terminal;
transmitting at least one non-zero power CSI-RS for a downlink channel state to the terminal based on the CSI-RS configuration for the beamformed CSI-RS; and
receiving, from the terminal, first channel state information (CSI) for the downlink channel state,
wherein the first CSI measured in one subframe before reporting the first CSI is obtained based on a measurement restriction window, in case that the first indicator indicates that the channel measurement restriction is supported, and
wherein the first indicator is used to restrict the at least one non-zero power CSI-RS used to obtain the first CSI based on the CSI-RS configuration.

10. The method of claim 9, wherein the first CSI is obtained based on a non-zero power CSI-RS measured in the one subframe before reporting the first CSI without averaging other non-zero power CSI-RSs.

11. The method of claim 9, wherein the first CSI is obtained in case that the beamformed CSI-RS is configured and the first indicator indicating that the channel measurement restriction is supported, and
wherein a configured size of the measurement restriction window is used for obtaining the first CSI in case that the channel measurement restriction is supported.

12. The method of claim 9, wherein the RRC message includes a channel state information-interference measurement (CSI-IM) configuration,
wherein second CSI for the downlink channel state is obtained based on the CSI-IM configuration and the CSI-RS configuration for beamformed CSI-RS, in case that the RRC message includes a second indicator indicating that interference measurement restriction is supported, and
wherein the second indicator is used to restrict at least one zero power CSI-RS used to obtain the second CSI based on the CSI-IM configuration.

13. A base station in a wireless communication system, the base station comprising:
a transceiver; and
a controller configured to:
transmit, to a terminal via the transceiver, a radio resource control (RRC) message including a channel state information-reference signal (CSI-RS) configuration for beamformed CSI-RS, and a first indicator indicating whether a channel measurement restriction is supported,
transmit, to the terminal via the transceiver, at least one non-zero power CSI-RS for a downlink channel state based on the CSI-RS configuration for the beamformed CSI-RS, and
receive, from the terminal via the transceiver, first channel state information (CSI) for the downlink channel state,
wherein the first CSI measured in one subframe before reporting the first CSI is obtained based on a measurement restriction window, in case that the first indicator indicates that the channel measurement restriction is supported, and
wherein the first indicator is used to restrict the at least one non-zero power CSI-RS used to obtain the first CSI based on the CSI-RS configuration.

14. The base station of claim 13, wherein the first CSI is obtained based on a non-zero power CSI-RS measured in the one subframe before reporting the first CSI without averaging other non-zero power CSI-RSs.

15. The base station of claim 13, wherein the first CSI is obtained in case that the beamformed CSI-RS is configured and the first indicator indicating that the channel measurement restriction is supported, and
wherein a configured size of the measurement restriction window is used for obtaining the first CSI in case that the channel measurement restriction is supported.

16. The base station of claim 13, wherein the RRC message includes a channel state information-interference measurement (CSI-IM) configuration,
wherein second CSI for the downlink channel state is obtained based on the CSI-IM configuration and the CSI-RS configuration for beamformed CSI-RS, in case that the RRC message includes a second indicator indicating that interference measurement restriction is supported, and
wherein the second indicator is used to restrict at least one zero power CSI-RS used to obtain the second CSI based on the CSI-IM configuration.

* * * * *